(12) United States Patent
Ito et al.

(10) Patent No.: US 7,113,733 B2
(45) Date of Patent: Sep. 26, 2006

(54) IMAGE FORMING APPARATUS WITH MOVEABLE CLEANING OR TRANSFER MEMBER

(75) Inventors: Hiroshi Ito, Nagano (JP); Shinichi Kamoshida, Nagano (JP); Toshihiko Yamazaki, Nagano (JP); Shigeo Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 10/729,382

(22) Filed: Dec. 8, 2003

(65) Prior Publication Data

US 2005/0123326 A1    Jun. 9, 2005

(30) Foreign Application Priority Data

| Dec. 6, 2002 | (JP) | .......................... P. 2002-354816 |
| Jan. 7, 2003 | (JP) | .......................... P. 2003-000817 |
| Jan. 27, 2003 | (JP) | .......................... P. 2003-017813 |
| Jan. 27, 2003 | (JP) | .......................... P. 2003-017816 |
| Jan. 27, 2003 | (JP) | .......................... P. 2003-017817 |
| Jul. 14, 2003 | (JP) | .......................... P. 2003-196433 |
| Jul. 14, 2003 | (JP) | .......................... P. 2003-196434 |
| Jul. 14, 2003 | (JP) | .......................... P. 2003-196435 |

(51) Int. Cl.
*G03G 15/20* (2006.01)

(52) U.S. Cl. ...................... 399/308; 399/101; 399/302; 399/345

(58) Field of Classification Search ................. 399/66, 399/71, 302, 303, 308, 313, 318, 345, 350, 399/357, 101
See application file for complete search history.

(56) References Cited

U.S. PATENT DOCUMENTS

| 4,415,257 | A | * | 11/1983 | Kopp et al. ................. 399/318 |
| 5,983,062 | A | * | 11/1999 | Sameshima ................. 399/302 |
| 6,862,421 | B1 | * | 3/2005 | Choi .......................... 399/302 |

FOREIGN PATENT DOCUMENTS

| CN | 1252539 A | | 5/2000 |
| JP | 05224574 A | * | 9/1993 |
| JP | 08114995 A | * | 5/1996 |
| JP | 08146850 A | * | 6/1996 |
| JP | 8-305112 A | | 11/1996 |
| JP | 10-221967 A | | 8/1998 |
| JP | 11-184203 A | | 7/1999 |
| JP | 11288178 A | * | 10/1999 |
| JP | 3025070 B2 | | 1/2000 |
| JP | 2002-055534 | | 2/2002 |
| JP | 2002-91107 A | | 3/2002 |

OTHER PUBLICATIONS

Patent Office of the PRC Office Action dated Jun. 9, 2006.

* cited by examiner

*Primary Examiner*—Robert Beatty
(74) *Attorney, Agent, or Firm*—Sughrue Mion, PLLC

(57) ABSTRACT

An image forming apparatus includes a belt member, a secondary transfer member which is abutted against the belt member to secondary transfer a toner image to a recording medium and a contact/separation mechanism which brings the secondary transfer member into contact with a first widthwise end portion in the belt member first.

35 Claims, 15 Drawing Sheets

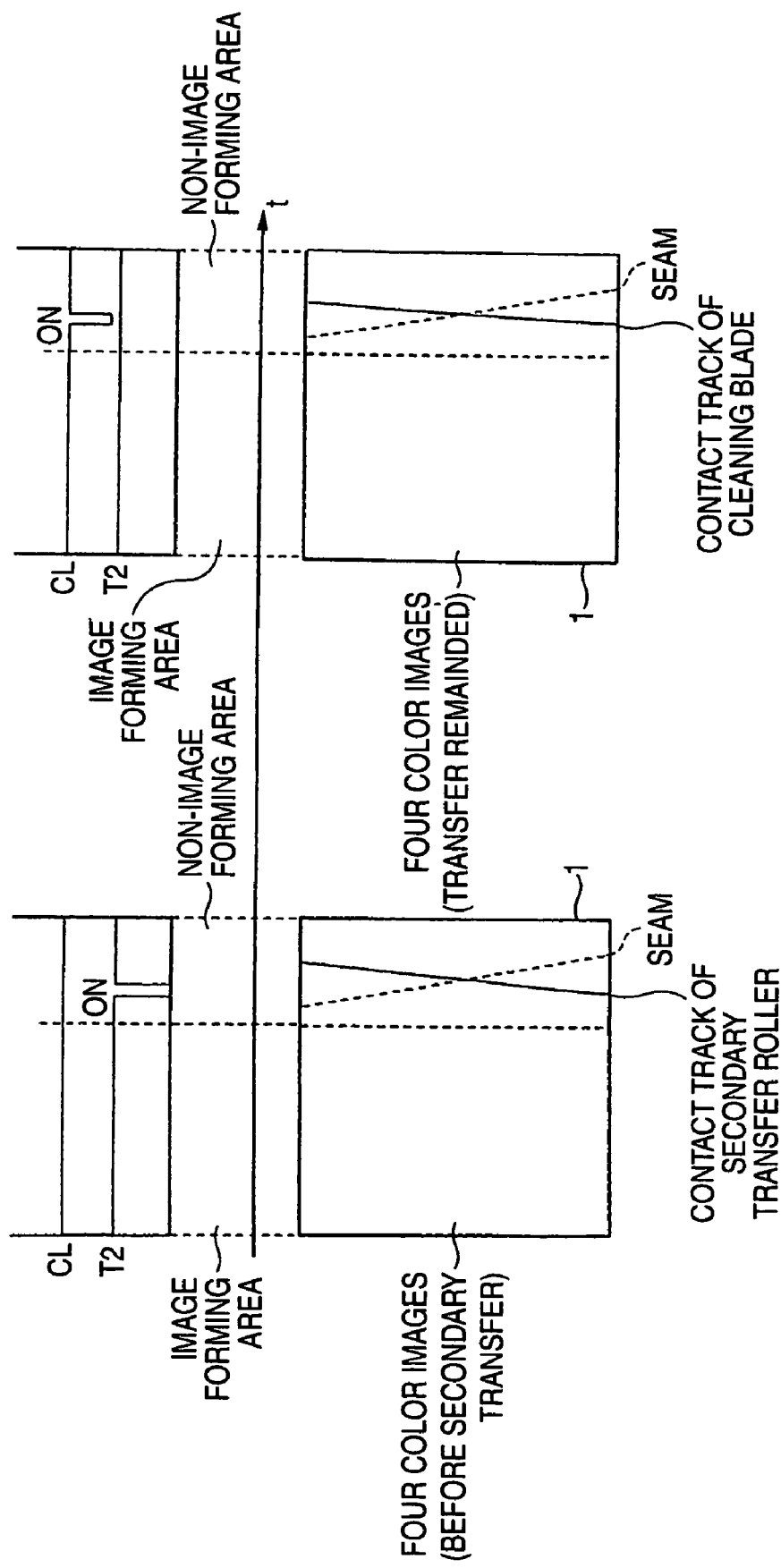

IMAGE FORMING APPARATUS WITH MOVEABLE CLEANING OR TRANSFER MEMBER

BACKGROUND OF THE INVENTION

The present invention relates to an image forming apparatus having a cleaning member or a transfer member which is brought into contact with and separated from an intermediate transfer member.

The present invention also relates to an image forming apparatus having a transfer roller which is brought into contact with and separated from an image carrying member and a mechanism for giving preliminary rotation to the transfer roller.

In image forming apparatus, toner images of four colors are sequentially formed on a photo conductor(s) and transferred to an intermediate transfer member so as to be superimposed one on another on the intermediate transfer member and are then transferred collectively to a sheet. The image forming apparatus includes a cleaning member and a secondary transfer roller that can contact and be separated from the intermediate transfer member. Remained toner is removed by the cleaning member after a transfer. (see JP-A-10-221967, JP-A-11-184203 and JP-A-2002-91107).

Also, another technique was proposed in which an endless belt is formed by joining the ends of an image transport belt together so as to produce a seam that is oblique with respect to the belt traveling direction to reduce the impact that occurs when a roller, cleaning blade, or the like goes over the seam (see JP-A-8-305112).

For example, in an image forming apparatus in which a color image is transferred to a transfer sheet by bringing a secondary transfer roller into contact with and separating it from an intermediate transfer belt for superimposition of images of different colors, the impact or impact-induced vibration that occurs when the secondary transfer roller contacts the intermediate transfer belt may disorder primary transfer images or move toner to cause a secondary transfer failure, resulting in an image formation failure. Toner and sheet material powder may be scattered by the impact or impact-induced vibration that occurs when the secondary transfer roller contacts the intermediate transfer-belt, and may be suspended in the air. If suspended toner or sheet material powder sticks to a voltage application member surface of the intermediate transfer belt, the electric resistance varies there and the application voltage to the intermediate transfer belt is thereby varied, resulting in an image formation failure.

Further, unfixted toner held on the intermediate transfer belt by electrostatic absorption may be suspended in the air due to the impact that occurs when the secondary transfer roller contacts the intermediate transfer member. Suspended toner may stick to the voltage application member surface. Further, a transfer sheet that is transported being in pressure contact with the secondary transfer roller and the intermediate transfer belt may emit sheet material powder because of friction with the intermediate transfer belt during a secondary transfer or the transfer roller. Sheet material powder is generated most during a secondary transfer. Toner or sheet material powder tends to stick to the voltage application member surface in this manner. Where voltage application is effected by that member's contacting a contact-type voltage application member, a conduction failure occurs until passage of that portion.

Also, the above patent publications discloses the in image forming apparatus having the cleaning blade and the secondary transfer roller which are brought into contact with and separated from the intermediate transfer member. The cleaning blade and the secondary transfer roller are brought into contact with the intermediate transfer member by moving those from a state that they are separate from and parallel with the intermediate transfer member. However, vibration that is caused by the impact at the time of contact may cause suspension of toner in the air. Also, it may weaken the electrostatic absorption of toner by the intermediate transfer belt. This phenomenon has a particularly great influence on a belt-like intermediate transfer member having a seam as disclosed in JP-A-8-305112.

Also, when color superimposition is performed on the intermediate transfer member, the secondary transfer roller is separated from the intermediate transfer belt so as not to disorder images. The secondary transfer roller contacts the intermediate transfer belt only when images are transferred to a transfer medium. Since the secondary transfer roller is stopped when the secondary transfer roller contacts the intermediate transfer belt, the secondary transfer roller serves as a load of the rotation of the intermediate transfer belt until rotation speed of the secondary transfer roller coincides with the rotation speed of the intermediate transfer belt. The load is transmitted to the primary transfer section to disorder an image during a primary transfer or cause a color misregistration problem that a deviation occurs between the positions of images of a current color and a preceding color. To prevent these problems, a method disclosed in JP-B-3025070 was proposed in which the secondary transfer roller is driven at a lower speed than the intermediate transfer belt by using a one-way clutch, whereby the impact and the load at the time of contact are reduced.

The method proposed in JP-B-3025070 has the following problem. Since a driving system for driving the secondary transfer roller is provided, vibration in the secondary transfer roller driving system is transmitted to the intermediate transfer member, whereby slight density unevenness occurs in the primary transfer section. Further, since the secondary transfer roller is equipped with the one-way clutch and a drive gear that is engaged with the one-way clutch and the secondary transfer roller is brought into contact with and separated from the intermediate transfer member in such a manner that the one-way clutch and the drive gear operate simultaneously with the secondary transfer roller, the mass of the members that operate together with the secondary transfer roller is large. This results in a problem that the impact that occurs when the secondary transfer roller contacts the intermediate transfer member is strong and resulting vibration that is transmitted to the primary transfer section nay cause image density unevenness or color misregistration.

SUMMARY OF THE INVENTION

It is therefore an object of the present invention to provide an image forming apparatus that is equipped with a transfer device having a secondary transfer member that contacts and is separated from a belt member, has an object of removing as many causes of image formation failures as possible by weakening the impact at the time of contact, reducing the frequency of occurrence of an event that an electrode layer that is provided on one side of the intermediate transfer member is stained, and enabling stable transport of the intermediate transfer member.

In order to achieve the above objects, according to the invention, there is provided an image forming apparatus, comprising:

a belt member;

a secondary transfer member, abutted against the belt member to secondary transfer a toner image to a recording medium; and a contact/separation mechanism, bringing the secondary transfer member into contact with a first widthwise end portion in the belt member first.

Preferably, the belt member has a multilayer structure with an electrode layer provided on the first widthwise end portion. The secondary transfer member is brought into contact with the electrode layer of the belt member first.

Preferably, the contact/separation mechanism separates the secondary transfer member from the first widthwise end portion in the belt member so that the secondary transfer member is entirely separated from the belt member.

Preferably, the image forming apparatus further includes a cleaning member which is abutted against the belt member. The cleaning member is brought into contact with the first widthwise end portion in the belt member first.

Preferably, the secondary transfer member and the cleaning member are respectively brought into contact with the belt member at a different timing.

Preferably, the secondary transfer member and the cleaning member are respectively separated from the belt member at a different timing.

Preferably, the belt member has a multilayer structure with an electrode layer provided on the first widthwise end portion. The secondary transfer member and the cleaning member are brought into contact with the electrode layer of the belt member first.

Preferably, the contact/separation mechanism separates the cleaning member from the first widthwise end portion in the belt member so that the cleaning member is entirely separated from the belt member.

Preferably, the belt member is seamed to form an endless belt, and the belt member including a first region corresponding to an image forming region and a second region corresponding to a non-image forming area, the second region having a seam of the belt member. The contact/separation mechanism brings the secondary transfer member into contact with a first widthwise end portion in the second region of the belt member first. The secondary transfer member is entirely brought into contact with the belt member in the second region thereof so that a track of a contact point between the secondary transfer member and the belt member extends so as to cross the seam of the belt member.

Preferably, the image forming apparatus includes a cleaning member which is abutted against the belt member. The cleaning member is brought into contact with the first widthwise end portion in the second region of the belt member first. The cleaning member is entirely brought into contact with the belt member in the second region thereof so that a track of a contact point between the cleaning member and the belt member extends so as to cross the seam of the belt member.

Preferably, the cleaning member is entirely brought into contact with the belt member in the second region thereof so that a track of a contact point between the cleaning member and the belt member extends so as to avoid the seam of the belt member.

Preferably, the secondary transfer member and the cleaning member are respectively brought into contact with the belt member at a different timing.

Preferably, the secondary transfer member and the cleaning member are respectively separated from the belt member at a different timing.

Preferably, the contact/separation mechanism separates the cleaning member from the first widthwise end portion in the belt member so that the cleaning member is entirely separated from the belt member.

Preferably, the belt member has a multilayer structure with an electrode layer provided on the first widthwise end portion. The secondary transfer member and the cleaning member are respectively brought into contact with the electrode layer of the belt member first.

Preferably, the contact/separation mechanism separates the secondary transfer member from the first widthwise end portion in the belt member so that the second transfer member is entirely separated from the belt member.

Preferably, the belt member is seamed to form an endless belt, and the belt member including a first region corresponding to an image forming region and a second region corresponding to a non-image forming area, the second region having a seam of the belt member. The contact/separation mechanism brings the secondary transfer member into contact with the first widthwise end portion in the second region of the belt member first. The secondary transfer member is entirely brought into contact with the belt member in the second region thereof so that a track of a contact point between the secondary transfer member and the belt member extends so as to avoid the seam of the belt member.

Preferably, the image forming apparatus includes a cleaning member which is abutted against the belt member. The cleaning member is brought into contact with the first widthwise end portion in the second region of the belt member first. The cleaning member is entirely brought into contact with the belt member in the second region thereof so that a track of a contact point between the cleaning member and the belt member extends so as to cross the seam of the belt member.

Preferably, the cleaning member is entirely brought into contact with the belt member in the second region thereof so that a track of a contact point between the cleaning member and the belt member extends so as to avoid the seam of the belt member.

Preferably, the secondary transfer member and the cleaning member are respectively brought into contact with the belt member at a different timing.

Preferably, the secondary transfer member and the cleaning member are respectively separated from the belt member at a different timing.

Preferably, the contact/separation mechanism separates the cleaning member from the first widthwise end portion in the belt member so that the cleaning member is entirely separated from the belt member.

Preferably, the belt member has a multilayer structure with an electrode layer provided on the first widthwise end portion. The secondary transfer member and the cleaning member are respectively brought into contact with the electrode layer of the belt member first.

Preferably, the contact/separation mechanism separates the secondary transfer member from the first widthwise end portion in the belt member so that the second transfer member is entirely separated from the belt member.

According to the present invention, there is also provided an image forming apparatus, comprising:

a belt member;

a secondary transfer member, abutted against the belt member to secondary transfer a toner image to a recording medium; and a contact/separation mechanism, keeping the secondary transfer member in contact with a first widthwise end portion in the belt member.

Preferably, the belt member has a multilayer structure with an electrode layer provided on the first widthwise end portion. The secondary transfer member is kept in contact with the electrode layer of the belt member.

Preferably, a first end portion of the secondary transfer member which is kept in contact with the first widthwise end portion in the belt member is formed by an insulative elastic member.

Preferably, the secondary transfer member is a secondary transfer roller. The insulative elastic member is larger in diameter than the secondary transfer roller. The insulative elastic member is comprised of a material that is softer than the secondary transfer roller.

Also, the another object of the present invention is to provide an image forming apparatus capable of reducing the impact that occurs at the time contact of a cleaning member in an image forming apparatus having the cleaning member that contacts and is separated from an intermediate transfer member.

In order to achieve the above objects, according to the invention, there is provided an image forming apparatus, comprising:

a belt member;

a cleaning member, abutted against the belt member; and a contact/separation mechanism, bringing the cleaning member into contact with a first widthwise end portion in the belt member first.

Preferably, the belt member has a multilayer structure with an electrode layer provided on the first widthwise end portion. The cleaning member is brought into contact with the electrode layer of the belt member first.

Preferably, the belt member is seamed to form an endless belt.

Preferably, the contact/separation mechanism separates the cleaning member from the first widthwise end portion in the belt member so that the cleaning member is entirely separated from the belt member.

Preferably, the belt member is seamed to form an endless belt, and the belt member including a first region corresponding to an image forming region and a second region corresponding to a non-image forming area, the second region having a seam of the belt member. The contact/separation mechanism brings the cleaning member into contact with the first widthwise end portion in the second region of the belt member first. The contact/separation mechanism separates the cleaning member from the first widthwise end portion in the second region of the belt member so that the cleaning member is entirely separated from the belt member.

Also, the another object of the present invention is to provide an image forming apparatus capable of preventing color misregistration or density unevenness that is caused by the impact or a speed difference that occurs or exists when the secondary transfer roller contacts an image carrier such as an intermediate transfer member.

In order to achieve the above objects, according to the invention, there is provided an image forming apparatus, comprising:

an image carrier;

a transfer roller;

a contact/separation mechanism, bringing the transfer roller into contact with the image carrier, and separating the transfer roller from the image carrier; and a rotation applier, applying a preliminary rotation to the transfer roller in a state that the transfer roller is separated from the image carrier, wherein the rotation applier and the transfer roller are separated from each other mechanically in a state that the transfer roller is in contact with the image carrier.

Preferably, a circumferential speed of the preliminary rotation to be applied to the transfer roller is higher than or equal to that of the image carrier.

Preferably, the rotation applier applies the preliminary rotation to the transfer roller at a first rotation speed. The rotation applier applies a posterior rotation to the transfer roller at a second rotation speed different from the first rotation speed in a state that the rotation applier is engaged with the transfer roller after a transfer is performed.

In the above configurations, the impact and vibration that occur at the time contact of the cleaning blade are suppressed, image formation failures such as banding can be prevented, and toner is prevented from being scattered by impact and suspended in the air.

Also, in the above configurations, since the contact/separation mechanism for causing one end of the secondary transfer member to contact the intermediate transfer member first is provided, the impact that occurs when the secondary transfer member contacts the belt member such as an intermediate transfer member or a recording medium feeding member is weakened and the amount of toner or sheet material powder that is suspended in the air as a result of the impact can be reduced to lower the frequency of occurrence of image formation failures. In particular, where the belt member has an electrode layer on one side, bringing the electrode-layer-side end of the secondary transfer member in contact with the belt member first can suppress the sticking of suspended toner or sheet material powder to the electrode layer. Moreover, causing the one end that contacted the belt member first to be separated therefrom last makes it possible to further suppresses the sticking of suspended toner or sheet material powder to the electrode layer.

Since the contact/separation mechanism for causing one end of the secondary transfer member to be always kept in contact with the belt member, the impact at the time of contact of the secondary transfer member is weakened and the amount of toner or sheet material powder that is suspended in the air as a result of the impact can be reduced to lower the frequency of occurrence of image formation failures. In particular, where the belt member has an electrode layer on one side, causing the electrode-layer-side end of the secondary transfer member to be always kept in contact with the belt member can suppress the sticking of suspended toner or sheet material powder to the electrode layer. Moreover, using an insulative elastic member to form the portion of the secondary transfer member that is kept in contact with the belt member makes it possible to absorb vibration that occurs at the time of contact and prevents sticking, by electrostatic absorption, of toner that is caused to be suspended in the air during a transfer. Since the insulative elastic member is larger in diameter and softer than the secondary transfer member, even if it is always kept in contact with the belt member, an electrically stable state can be established during a primary transfer and vibration that is caused by contact of the secondary transfer member can be absorbed positively. Since the insulative elastic member is softer than the secondary transfer member, the nip width of the secondary transfer member and the belt member and the pressure applied can be kept stable in the axial direction of the secondary transfer member when the secondary transfer member is entirely brought into contact with the belt member by pushing the other end of the secondary transfer member.

Since the belt member is driven on the side opposite to the side where the secondary transfer member contacts the belt member first or is always kept in contact with the belt member, force that acts on the intermediate transfer member to move it toward the driving side to cause its snaking is canceled out by the effects of friction etc. that are generated by the contact of the secondary transfer member, whereby stable transport can be attained.

In the above configurations, the secondary transfer roller is given preliminary rotation while it is separated from the intermediate transfer member and, to start a transfer, the secondary transfer roller is separated from the rotation applier mechanically and brought into contact with the intermediate transfer member. Therefore, no speed variation occurs in the intermediate transfer member in its rotation direction and no color misregistration or density unevenness occurs in the primary transfer section etc. due to vibration that is caused by the impact at the time of contact. As a result, good images can be obtained.

In the above configurations, the impact and vibration that occur at the time contact of the cleaning member and secondary transfer member are suppressed, image formation failures such as banding can be prevented, and toner is prevented from being scattered by impact and suspended in the air. Especially, since the contact timing and the separation timing of the secondary transfer member and the cleaning member are different, the impact at the contact timing and the separation timing is reduced, thereby image formation failures such as banding can be prevented.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 13A and 10B illustrate manners of contact and separation of a cleaning blade according to a fourth embodiment of the invention;

FIGS. 20A and 20B are perspective views of a secondary transfer roller contact/separation mechanism as viewed approximately from the front side;

DETAILED DESCRIPTION OF THE PREFERRED EMBODIMENTS

Preferred embodiments of the invention will be described below in detail with reference to the accompanying drawings.

Figure 1:
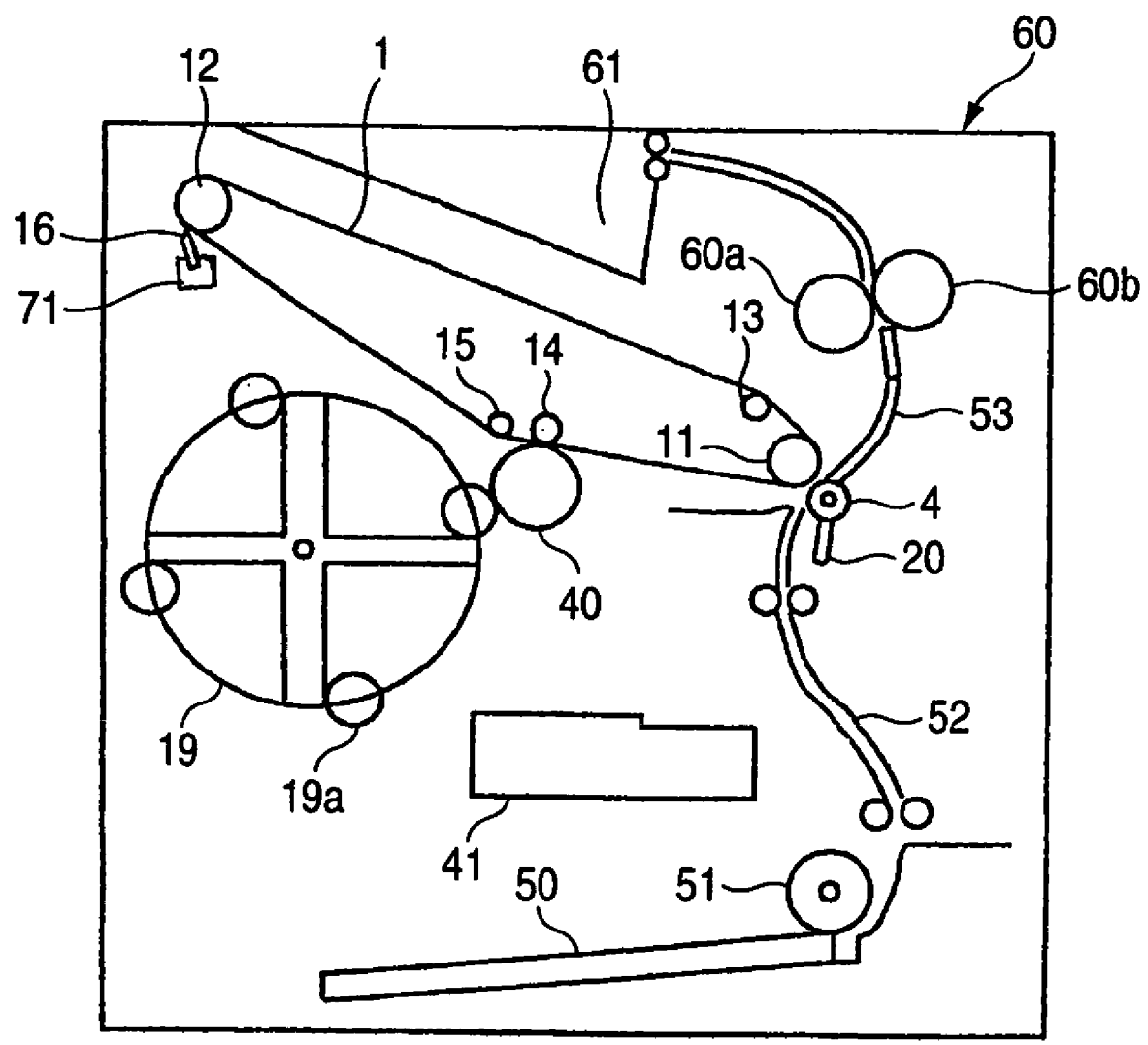
FIG. 1 shows an image forming apparatus according to a first embodiment of the present invention.

FIG. 1 shows an image forming apparatus according to a first embodiment.

A photo conductor 40 is charged uniformly by a charger (not shown) and an electrostatic latent image is formed thereon upon image exposure by an exposing device 41. A rotary developing device 19 for developing the electrostatic latent image into a toner image has developing units of four colors (i.e., Y, M, C, and K). A development roller 19a of each unit is brought, by intermittent rotation of the rotary developing device 19, to a position where it is opposed to the photo conductor 40, and toner development is performed there. An intermediate transfer member 1 that is stretched by a drive roller 11, a driven roller 12, support roller 15, a tension roller 13, and a primary transfer roller 14, etc. is brought into contact with and separated from the photo conductor 40 at the position of the primary transfer roller 14. Toner images of four colors are sequentially formed on the photo conductor 40 and transferred to the intermediate transfer member 1 (primary transfer): four color superimposition is performed on the intermediate transfer member 1.

A secondary transfer roller 4 that is brought into contact with and separated from the intermediate transfer member 1 by a contact/separation mechanism 20 is disposed at a position where it is opposed to the drive roller 11 (also serves as a secondary transfer backup roller). Toner images of four colors on the intermediate transfer member 1 are transferred collectively at this position (secondary transfer). More specifically, a sheet that is fed out of a sheet tray 50 by a sheet feed roller 51 is transported to the position of the secondary transfer roller 4 along a sheet transport path 52. During color superimposition on the intermediate transfer member 1 (i.e., during a primary transfer), the secondary transfer roller 4 is separated from the intermediate transfer member 1. On the other hand, during a secondary transfer, the secondary transfer roller 4 is in contact with the intermediate transfer member 1 and toner images of four colors are transferred collectively from the intermediate transfer member 1 to the sheet by application of a transfer bias (secondary transfer). After the secondary transfer is performed, the sheet introduced into a fuser 60 composed of a heating roller 60*a* and a pressure roller 60*b* through a sheet guide 53, and is ejected to an ejected sheet tray 61 provided at the top of the apparatus.

A cleaning blade 16 that is brought into contact with and separated from the intermediate transfer member 1 with the driven roller 12 as a backup roller by a contact/separation mechanism 71. The cleaning blade 16 contacts the intermediate transfer member 1 after a secondary transfer and removes toner that remains on the intermediate transfer member 1. As described later in detail, the cleaning blade 16 is driven by the contact/separation mechanism 71 in such a manner that one end of its edge contacts the intermediate transfer member 1 first and then the edge gradually contacts the intermediate transfer member 1 until the other end of the edge contacts the intermediate transfer member 1, whereby the impact due to the contact is made as weak as possible. The cleaning member is not limited to the cleaning blade and may be of any kind, that is, may be a brush, a roller, a sheet, or the like.

The secondary transfer roller 4, which is opposed to the drive roller 11, is brought into contact with and separated from the intermediate transfer member 1 by the contact/separation mechanism 20. In a secondary transfer, the secondary transfer roller 4 contacts the intermediate transfer member 1 and transfers toner images collectively to a sheet. As described later in detail, the secondary transfer roller 4 is driven the contact/separation mechanism 20 in such a manner that one end of the secondary transfer roller 4 contacts the intermediate transfer member 1 first and then the secondary transfer roller 4 gradually contacts the intermediate transfer member 1 until the other end contacts it, whereby the impact due to the contact is made as weak as possible.

Figure 2A:
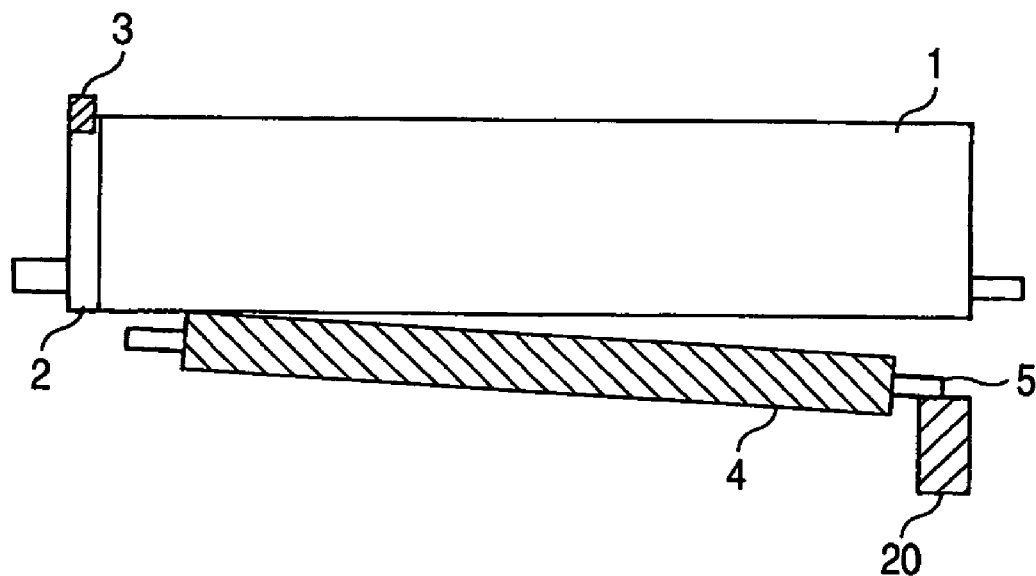
FIGS. 2A and 2B illustrate manners of contact and separation of a secondary transfer roller in the image forming apparatus.
Figure 2B:
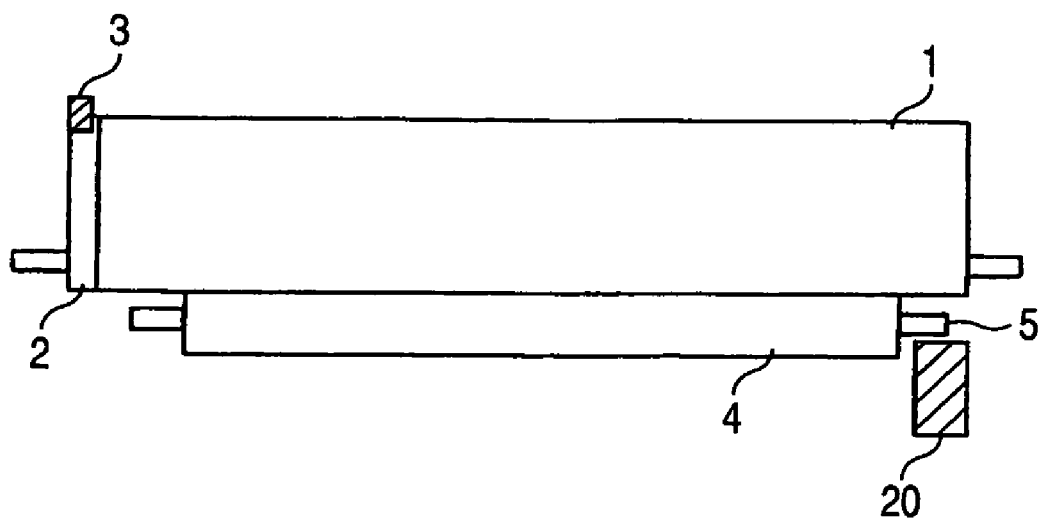

FIG. 2 illustrates manners of contact and separation of the secondary transfer roller 4 in the image forming apparatus according to this embodiment.

In the first embodiment, the intermediate transfer member 1 has a belt-like form, for example, and has a multilayer structure (described later in detail) in which an electrode layer 2 is provided at one end of the intermediate transfer member 1. A voltage is applied to the electrode layer 2 via an electrode roller 3. The secondary transfer roller 4, which is to contact and be separated from the intermediate transfer member 1, is driven by a contact/separation mechanism 20 (described later in detail) that is engaged with a roller shaft 5 in such a manner that the electrode-layer-2-side end of the secondary transfer roller 4 contacts the intermediate transfer member 1 first (see FIG. 2A) and then the secondary transfer roller 4 gradually contacts the intermediate transfer member 1 until the other end of the secondary transfer roller 4 contacts the intermediate transfer member 1 (see FIG. 2B). The same applies to a case that a secondary transfer blade is used in place of the secondary transfer roller 4. Images cannot be transferred until completion of the contact. Therefore, the contact of the secondary transfer roller 4 to the intermediate transfer member 1 is performed on a non-image-forming area of the intermediate transfer member 1. Where the intermediate transfer member 1 has a belt-like form, the non-image-forming area is an area including a belt seam and the contact operation is performed on such a non-image-forming area.

By virtue of the above operation that one end of secondary transfer roller 4 contacts the intermediate transfer member 1 first and then the secondary transfer roller 4 gradually contacts the intermediate transfer member 1, the impact at the time of contact is made weaker than in the case that the entire secondary transfer roller 4 contacts the intermediate transfer member 1 at one time, whereby scattering of toner or sheet material powder can be suppressed. In this embodiment, since the electrode layer 2 is disposed on one side of the intermediate transfer member 1, bringing the electrode-layer-2-side end of the secondary transfer roller 4 into contact with the intermediate transfer member 1 first prevents toner or sheet material powder from sticking to the electrode layer 2 and causing a conduction failure between the electrode layer 2 and the electrode roller 3. Further, at the time of separation, the contact/separation mechanism 20 operates so as to first separate the end of the secondary transfer roller 4 that is located on the side opposite to the electrode layer 2 and to separate the electrode-layer-2-side end last. Since the electrode-layer-2-side end of the secondary transfer roller 4 is kept in contact with the intermediate transfer member 1 until the very last moment of the separating operation, the sticking of toner or sheet material powder to the electrode layer 2 can be prevented more thoroughly. When the intermediate transfer member has a structure in which the entire surface serves as an electrode layer instead of a multilayer structure, the secondary transfer roller 4 may be separated at one time.

Figure 3:
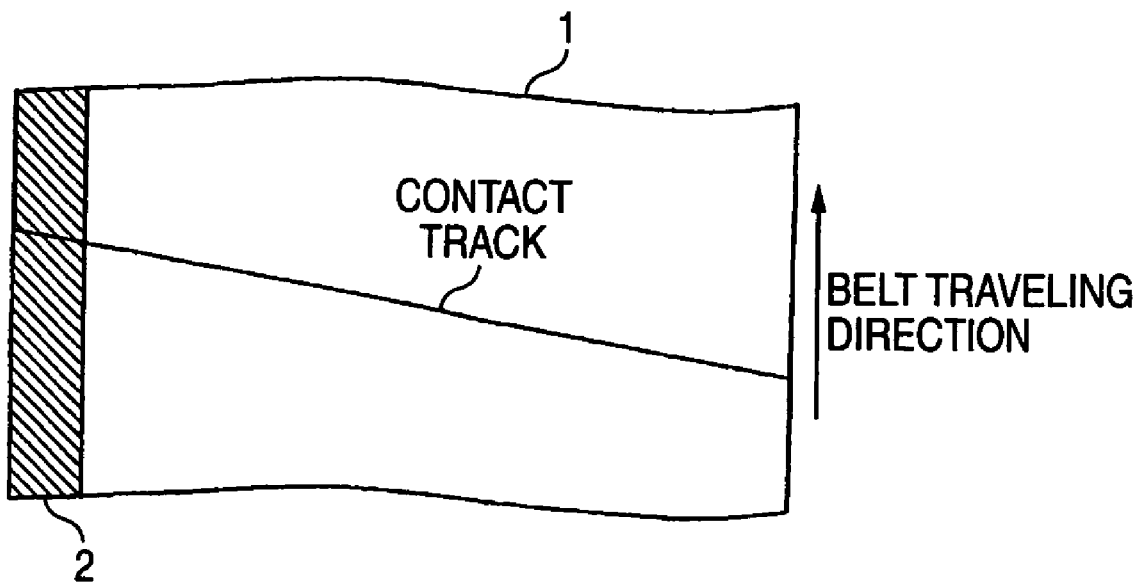
FIG. 3 is a plan view of an intermediate transfer belt.
Figure 4:
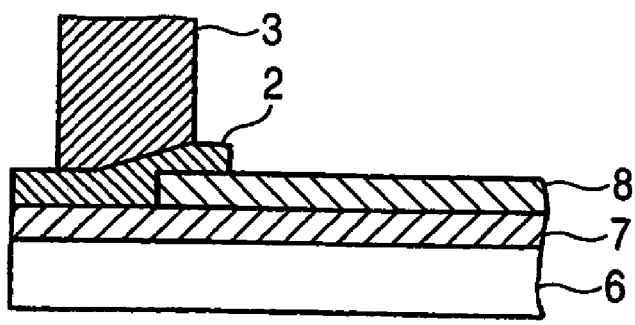
FIG. 4 is a sectional view of the intermediate transfer belt.

FIGS. 3 and 4 are a plan view and a sectional view of the intermediate transfer belt according to the first embodiment.

Since the secondary transfer roller 4 contacts the intermediate transfer member 1 gradually starting from its electrode-layer-2-side end, a contact track of the secondary transfer roller 4 forms a prescribed angle with the belt width direction (as indicated by an arrow in FIG. 3, the intermediate transfer belt 1 travels upward in the paper surface of FIG. 3).

As shown in FIG. 4, the intermediate transfer member 1 of this embodiment has a three-layer structure in which a conductive layer 7 made of aluminum or the like is formed on a substrate 6 made of PET and a semiconductive layer 8 (paint) is formed on the surface of the conductive layer 7. The intermediate transfer member 1 has a band-like end portion where the semiconductive layer 8 is not applied and the electrode layer 2 is formed on the surface of that exposed band-like portion of the conductive layer 7. The electrode layer 2 extends to overlap with the semiconductive layer 8. The electrode roller 3 applies a transfer bias to the conductive layer 7 by contacting the electrode layer 2.

Figure 5:
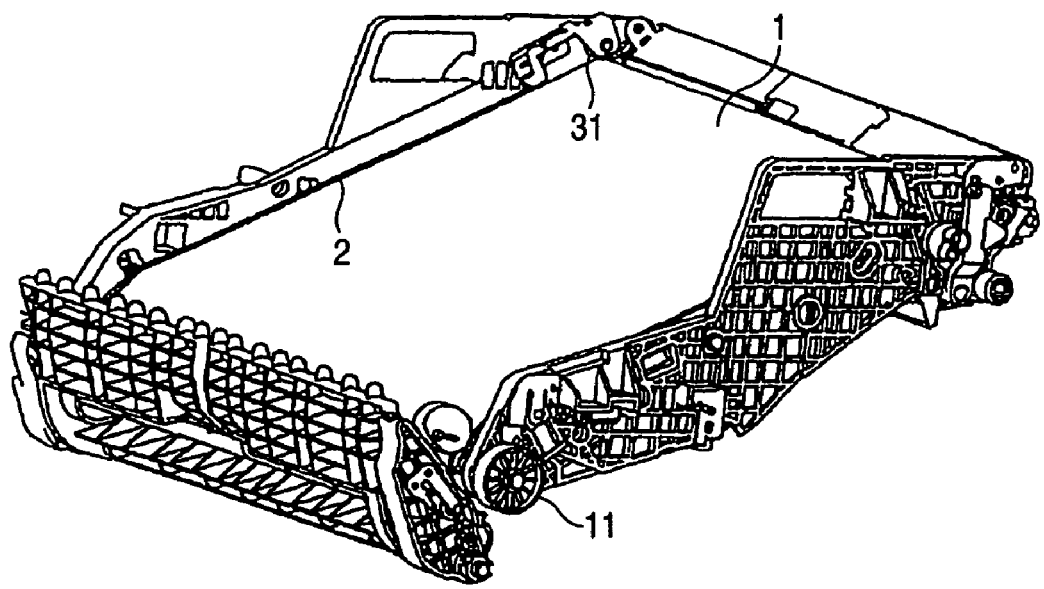
FIG. 5 is a perspective view of a intermediate transfer unit as a whole.
Figure 6:
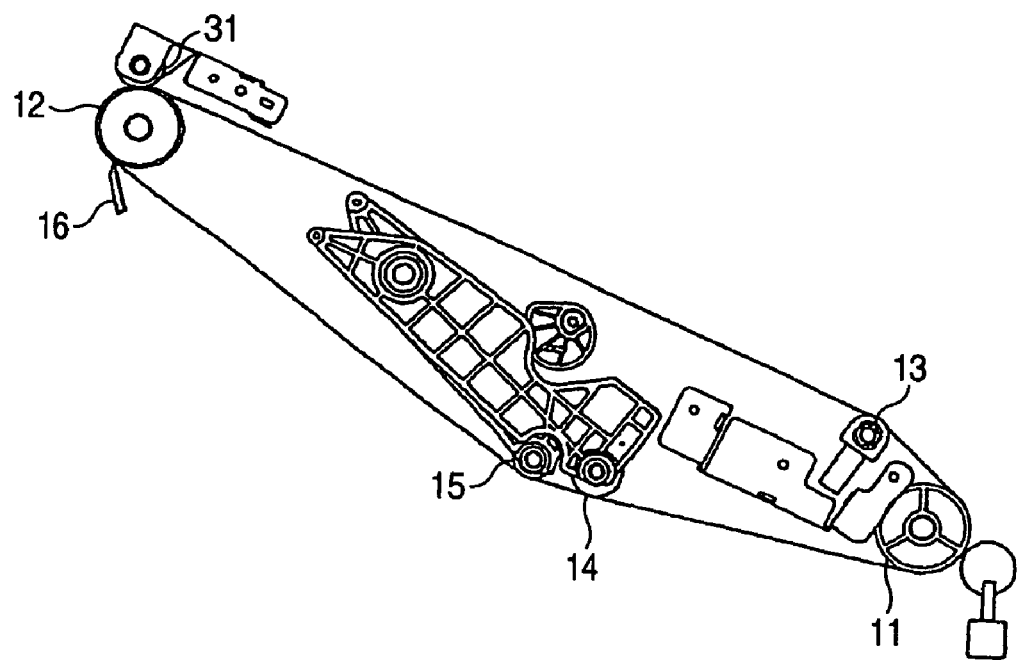
FIG. 6 is a sectional view of an important part illustrating the intermediate transfer belt.
Figure 7:
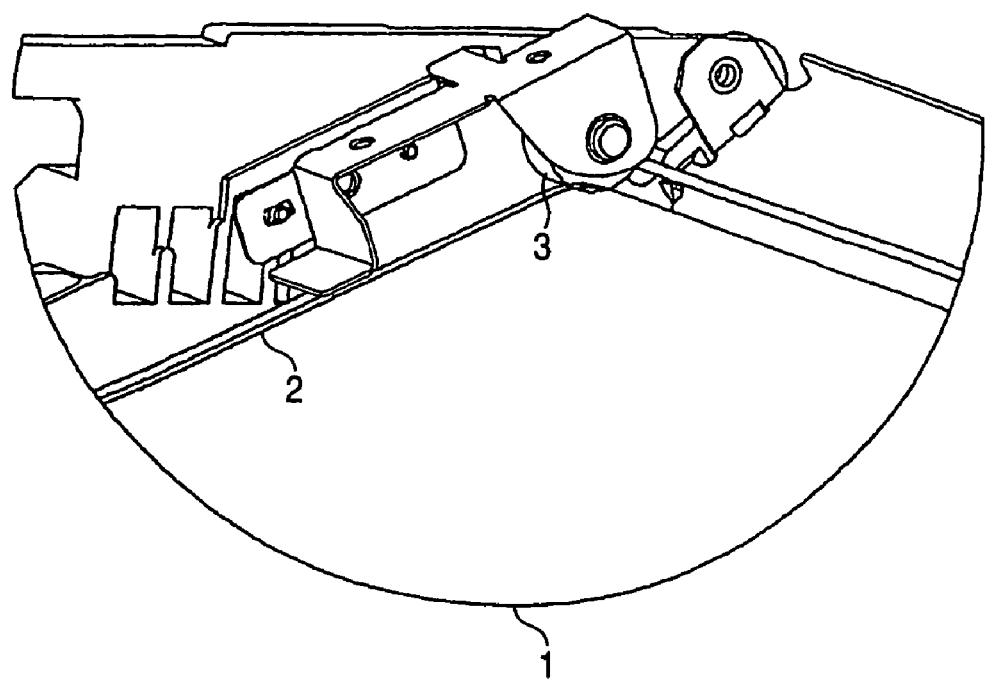
FIG. 7 is a perspective view illustrating a electrode roller and its vicinity.

FIG. 5 is a perspective view of an intermediate transfer unit as a whole according to the first embodiment. FIG. 6 is a sectional view of an important part illustrating the intermediate transfer belt 1. FIG. 7 is a perspective view illustrating the electrode roller 3 and its vicinity.

The drive roller 11, which is disposed at one end of the intermediate transfer unit, drives the intermediate transfer belt 1. The electrode layer 2 is formed at one end of the intermediate transfer belt 1, and the electrode roller 3 is provided so as to rotate being in contact with the electrode layer 2. The intermediate transfer belt 1 is rotated in a prescribed direction by the drive roller 11 and the driven roller 12, and is given prescribed tension by the tension roller 13. The metal support roller 15 is provided to ensure the nip of the primary transfer backup roller 14 and the photo conductor 40. A cleaning blade 16 for cleaning the surface of the intermediate transfer belt 1 by contacting is disposed so as to be opposed to the driven roller 12.

As shown in an enlarged view of FIG. 7, the electrode layer 2 is formed at one end of the intermediate transfer belt 1. The electrode roller 3 made of elastic rubber is disposed at such a position as to be opposed to the driven roller 12, and is supplied with a voltage of 220 V.

Next, the contact/separation mechanism 20 according to the first embodiment will be described.

Figure 8:
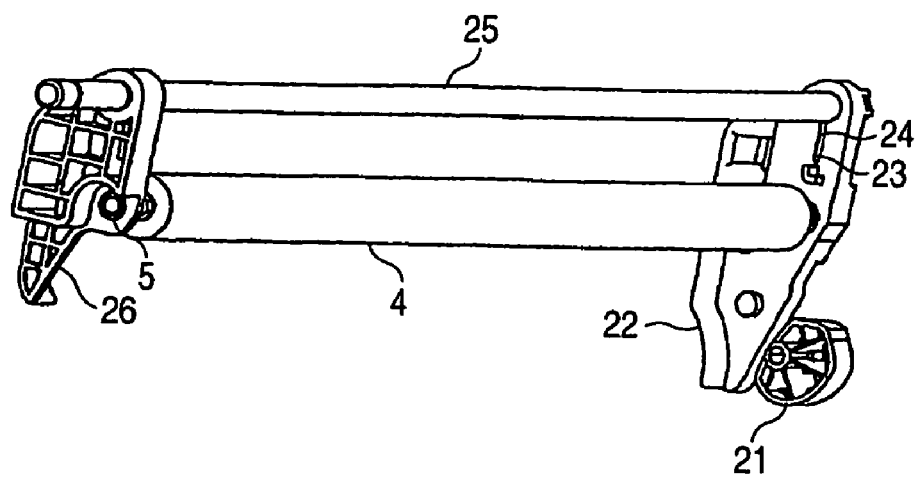
FIG. 8 is a perspective view of a contact/separation mechanism as viewed approximately from the front side.
Figure 9A:
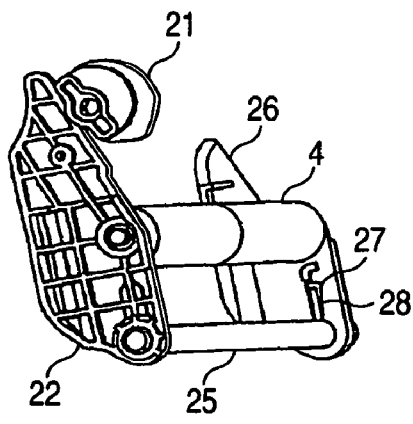
FIGS. 9A and 9B is perspective views of the contact/separation mechanism as viewed approximately from the two respective ends.
Figure 9B:
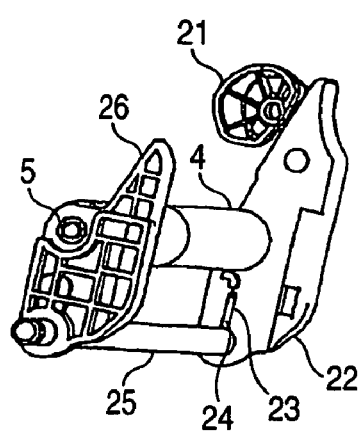

FIG. 8 is a perspective view of the contact/separation mechanism 20 as viewed approximately from the front side. FIG. 9 is perspective views of the contact/separation mechanism 20 as viewed approximately from the two respective ends.

A roller shaft 5 of the secondary transfer roller 4 is supported by the brackets 22 and 26 that are disposed at both ends. The brackets 22 and 26 are loosely fitted with a rotary shaft 25. The brackets 22 and 26 are formed with holes 23 and 27 in which pins 24 and 28 that are planted in the rotary shaft 25 are inserted, respectively. No play exists between the pin 24 and the hole 23 of the bracket 22 which is engaged with the cam 21. As the bracket 22 is driven by the cam 21, the rotary shaft 25 is rotated without delay. On the other hand, play exists between the pin 28 and the hole 27 of the bracket 26. The bracket 26 and hence the secondary transfer roller 4 start to turn after the rotary shaft 25 is rotated and the pin 28 touches a wall of the hole 27. The bracket 26 is urged by a spring (not shown) toward the intermediate transfer member 1, that is, in such a direction that the pin 28 is kept in contact with the other wall of the hole 27. As a result, when the bracket 22 is driven by the cam 21, the bracket-26-side end of the secondary transfer roller 4 contacts the intermediate transfer member 1 earlier than the bracket-22-side end by a time corresponding to the play between the hole 27 and the pin 28. On the other hand, at the time of separation, the bracket-22-side end of the secondary transfer roller 4 is separated from the intermediate transfer member 1 earlier than the bracket-26-side end by a time corresponding to the play between the hole 27 and the pin 28.

Figure 10A:
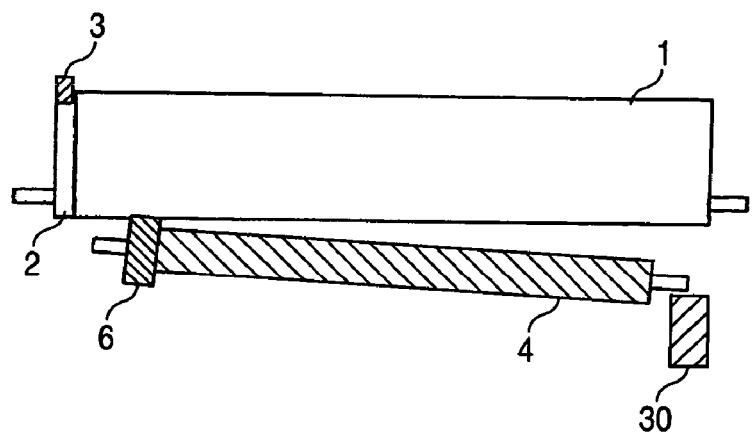
FIGS. 10A and 10B illustrate the secondary transfer roller according to a second embodiment of the invention.
Figure 10B:
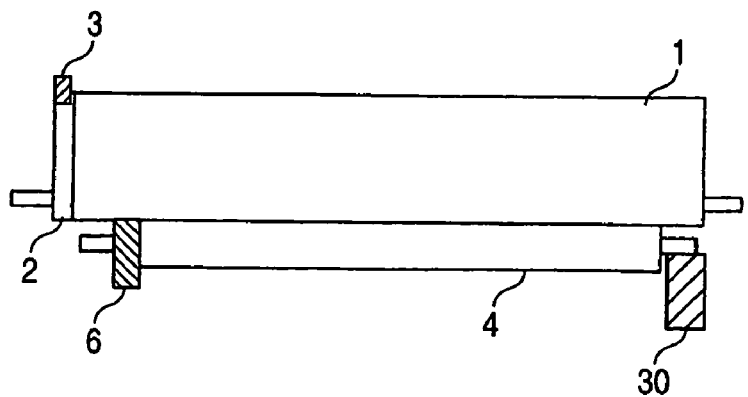

FIGS. 10A and 10B illustrate the secondary transfer roller according to a second embodiment. FIG. 10A shows a separated state of the secondary transfer roller 4 and FIG. 10B shows a contact state of the secondary transfer roller 4. Components in FIG. 10 having the same components in FIG. 2 are given the same reference numerals as the latter.

The second embodiment is different from the first embodiment shown in FIG. 2 only in that one end of the secondary transfer roller 4 is always kept in contact with the intermediate transfer member 1. The secondary transfer roller 4 is gradually brought into contact with the intermediate transfer member 1 by pushing the separated end by a contact/separation mechanism 30. The secondary transfer roller 4 is separated merely by pulling it with the contact/separation mechanism 30. The one end of the secondary transfer roller 4 that is always kept in contact with the intermediate transfer member 1 is formed by an insulative elastic member 6. The insulative elastic member 6 is larger in diameter than the secondary transfer roller 4 and is made of a material that is softer than the secondary transfer roller 4 so that uniform contact is established between the secondary transfer roller 4 and the intermediate transfer member 1 when the entire secondary transfer roller 4 is in contact with the intermediate transfer member 1 (see FIG. 10B). Also in the second embodiment, a transfer blade may be used in place of the secondary transfer roller.

Since as described above the one end of the secondary transfer roller 4 is always kept in contact with the intermediate transfer member 1, the impact at the time of contact is reduced and scattering of toner or sheet material powder can be suppressed. In this embodiment, the intermediate transfer member 1 has the electrode layer 2 at one end. Therefore, keeping the electrode-layer-2-side end of the transfer roller 4 always in contact with the intermediate transfer member 1 prevents toner or sheet material powder from sticking to the electrode layer 2 and causing a conduction failure between the electrode layer 2 and the electrode roller 3.

In the first embodiment, one end of the secondary transfer roller 4 is first brought into contact with the intermediate transfer member 1. However, the cleaning blade 16 may be brought into contact with the intermediate transfer member 1 in the same manner as the secondary transfer roller 4 is. That is, one end of the cleaning blade 16 is first brought into contact with the intermediate transfer member 1 and then the cleaning blade 16 is gradually brought into contact with the intermediate transfer member 1.

Figure 11A:
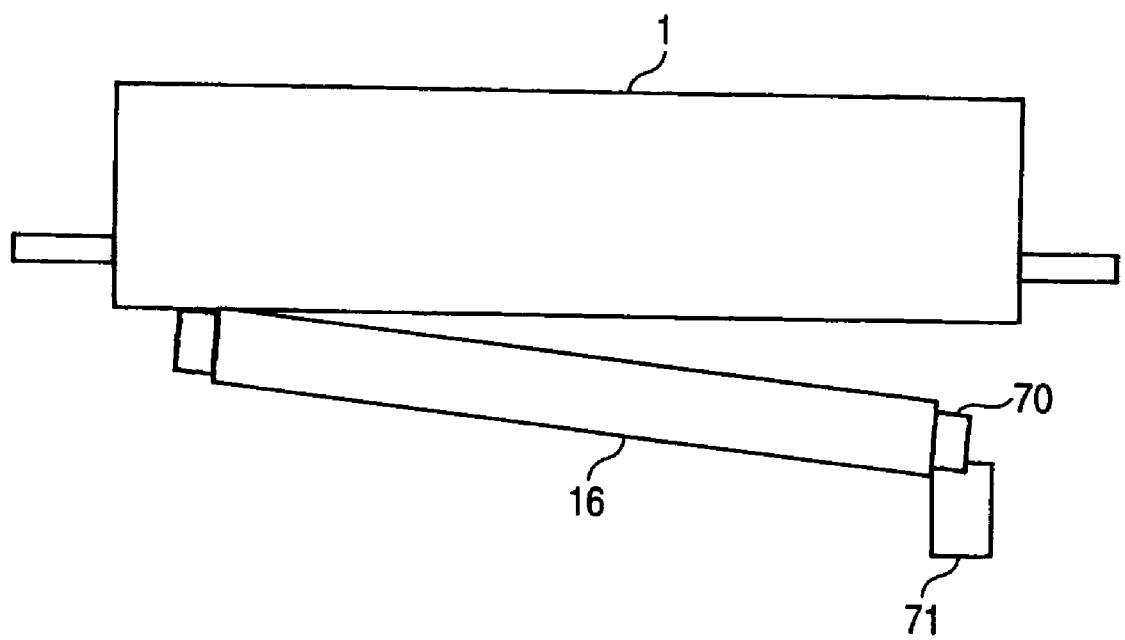
FIGS. 11A and 11B illustrate manners of contact and separation of a cleaning blade according to a third embodiment of the invention.
Figure 11B:
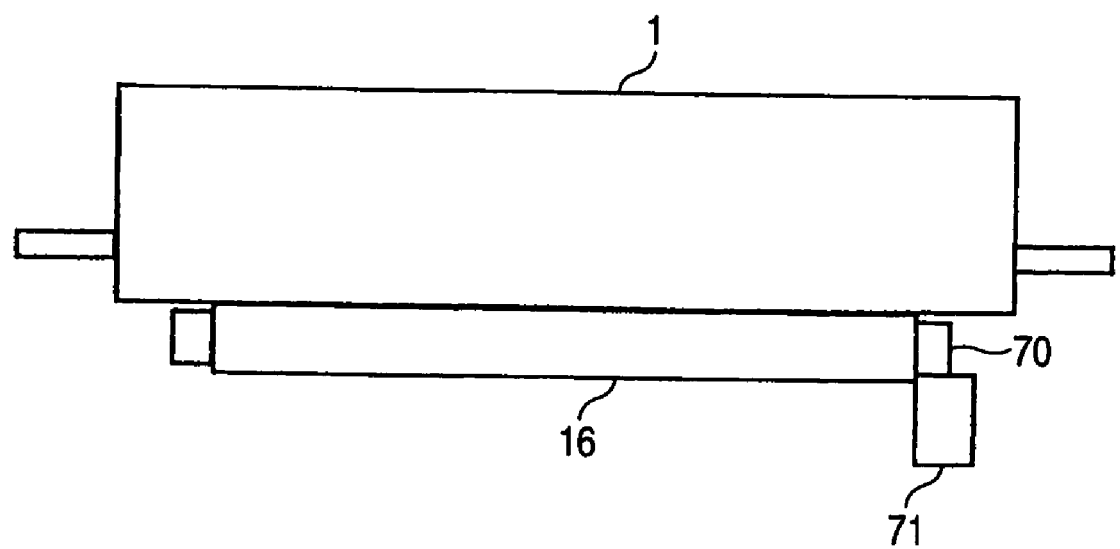
Figure 12:
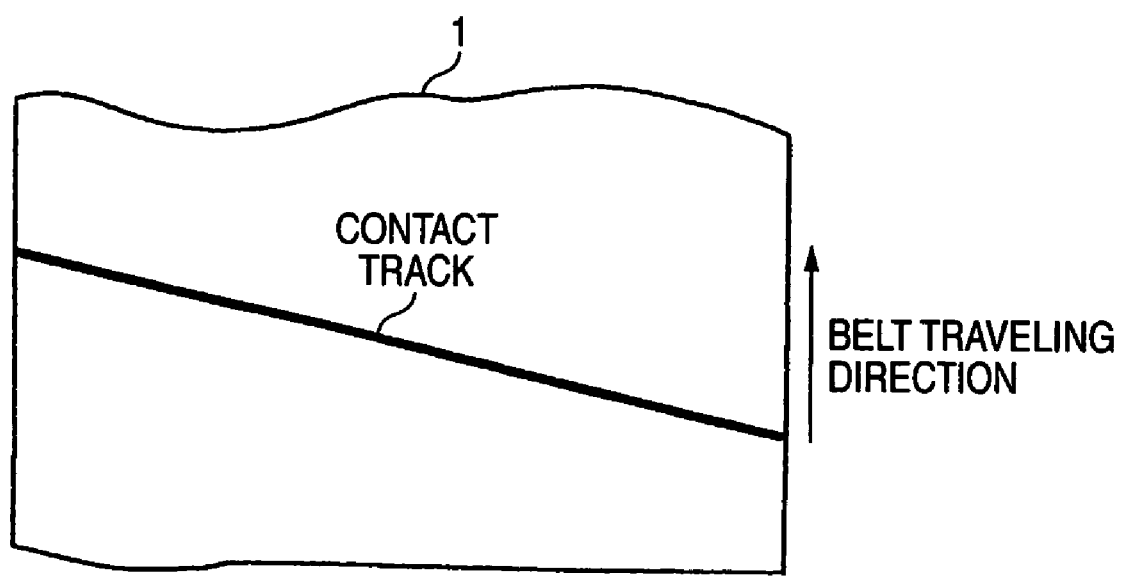
FIG. 12 is a plan view of an intermediate transfer medium.

FIGS. 11A and 11B illustrate manners of contact and separation of the cleaning blade 16 in the image forming apparatus of FIG. 1 according a third embodiment. FIG. 12 is a plan view of the intermediate transfer member 1.

In the third embodiment, the intermediate transfer member 1 has a single-layer structure and a voltage is applied to its back surface from an electrode (not shown). The cleaning blade 16, which is to contact and be separated from the intermediate transfer member 1, is driven by the contact/separation mechanism 71 (described later in detail) that is engaged with an end bracket 40 in such a manner that one end of the edge of the cleaning blade 16 contacts the intermediate transfer member 1 first (see FIG. 11A) and then the edge gradually contacts the intermediate transfer member 1 until the other end of the edge contacts the intermediate transfer member 1 (see FIG. 11B). As shown in FIG. 12, when the intermediate transfer member 1 travels upward in the paper surface of FIG. 12 and the left end (in FIG. 12) of the edge of the cleaning blade 16 contacts the intermediate transfer member 1 first, a contact track is produced that is oblique with respect to the traveling direction of the intermediate transfer member 1.

By virtue of the above operation that one end of the edge of the cleaning blade 16 contacts the intermediate transfer member 1 first and then the edge gradually contacts the intermediate transfer member 1, the impact at the time of contact is made weaker than in the case that the entire edge contacts the intermediate transfer member 1 at one time, whereby scattering of toner or sheet material powder can be suppressed. Further, as described later, the contact/separation mechanism 71 causes the end of the edge that contacted the intermediate transfer member 1 first to be separated last. As a result, the impact due to the separation is weaker than in the case that the entire edge is separated at one time, whereby raising of toner or a like phenomenon can be prevented.

Figure 13A:
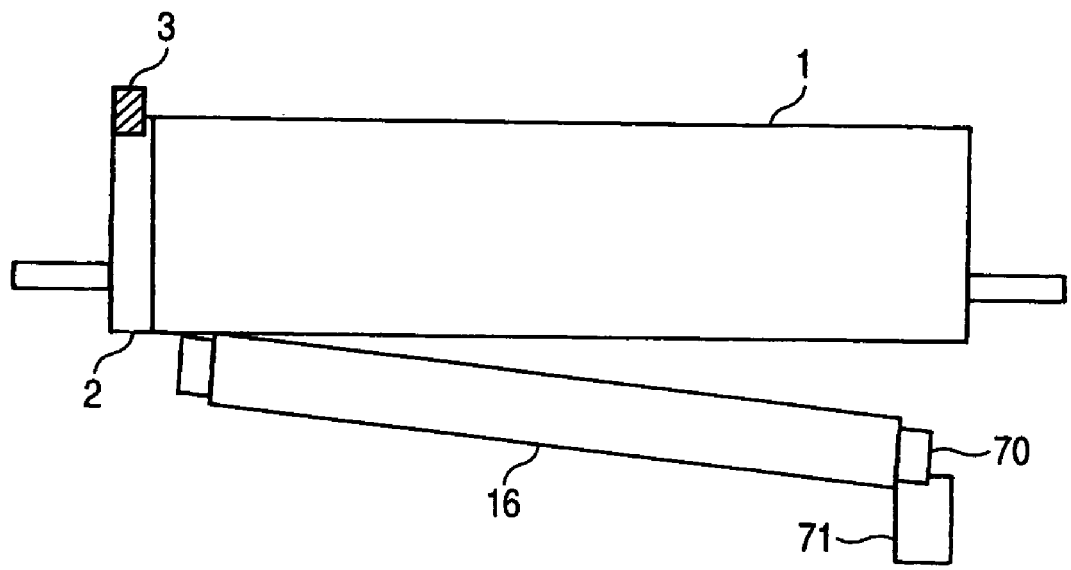
Figure 13B:
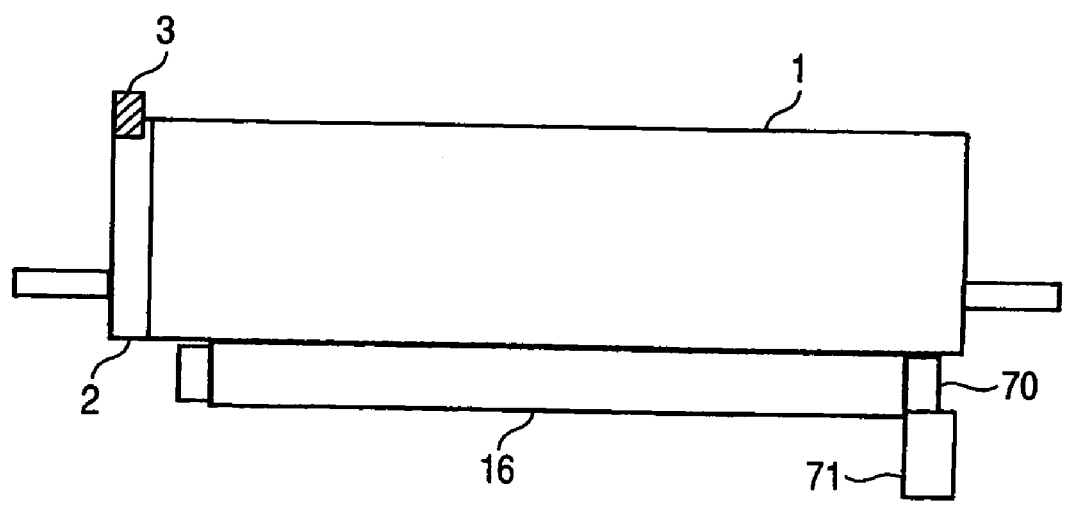
Figure 14:
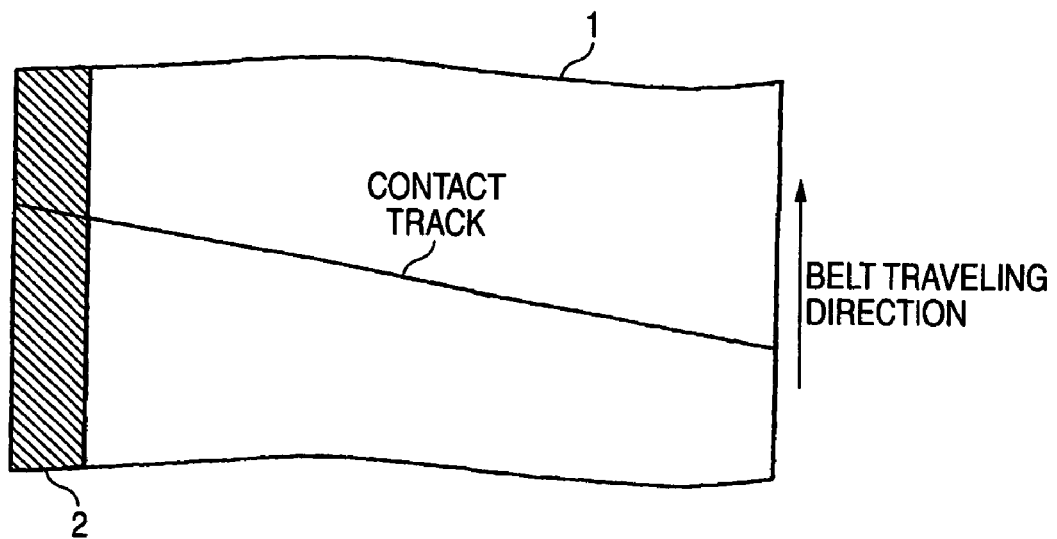
FIG. 14 is a plan view of an intermediate transfer medium.

FIGS. 13A and 13B illustrate manners of contact and separation of the cleaning blade 16 in the image forming apparatus according to a fourth embodiment. FIG. 14 is a plan view of an intermediate transfer member 1.

The intermediate transfer member 1 according to the fourth embodiment has a belt-like form, for example, and has a multilayer structure (described later in detail) in which an electrode layer 2 is provided at one end. A voltage is applied to the intermediate transfer member 1 via an electrode roller 3. The cleaning blade 16, which is to contact and be separated from the intermediate transfer member 1, is driven by the contact/separation mechanism 71 (described later in detail) that is engaged with an end bracket 70 in such a manner that the electrode layer 2-side end of the edge of the cleaning blade 16 contacts the intermediate transfer member 1 first (see FIG. 13A) and then the edge gradually contacts the intermediate transfer member 1 until the other end of the edge contacts the intermediate transfer member 1 (see FIG. 13B). As shown in FIG. 14, when the intermediate transfer member 1 travels upward in the paper surface of FIG. 14 and the electrode layer 2 is disposed on the left side in FIG. 14, a contact track is produced that is oblique with respect to the traveling direction of the intermediate transfer member 1.

By virtue of the above operation that the electrode layer 2-side end of the edge of the cleaning blade 16 contacts the intermediate transfer member 1 first and then the edge gradually contacts the intermediate transfer member 1, the impact at the time of contact is made weaker than in the case that the entire edge contacts the intermediate transfer member 1 at one time, whereby scattering of toner or sheet material powder can be suppressed. In this embodiment, since the electrode layer 2 is disposed on one side of the intermediate transfer member 1, bringing the electrode layer 2-side end of the edge of the cleaning blade 16 into contact with the intermediate transfer member 1 first prevents toner or sheet material powder from sticking to the electrode layer 2. Further, at the time of separation, the electrode layer 2-side end of the edge of the cleaning blade 16 is separated last, which prevents the electrode layer 2-side portion of the intermediate transfer member 1 from being stained.

Figure 15:
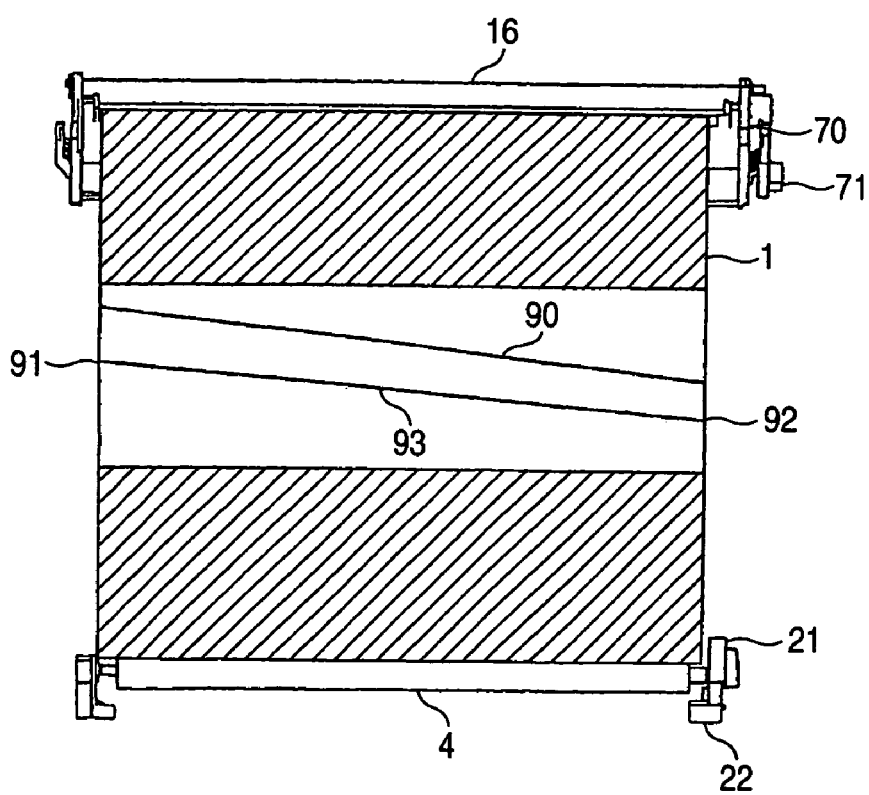
FIG. 15 illustrates manners of contact and separation of a cleaning blade according to a fifth embodiment of the invention.

FIG. 15 illustrates manners of contact and separation of the cleaning blade 16 in the image forming apparatus according to a fifth embodiment.

In FIG. 15, when an intermediate transfer member 1 has a seam 90 that is oblique with respect to the traveling direction (upward in the paper surface of FIG. 15). Using the endless intermediate transfer member 1 having the oblique seam 90 makes it possible to reduce the impact that occurs when each roller or the cleaning blade 16 goes over the seam 90. Both ends of a support shaft of the cleaning blade 16 are provided with brackets 70 and 86. A cam 71 is engaged with the bracket 70 to constitute a contact/separation mechanism. The end of the edge of the cleaning blade 16 that is located on the side opposite to the cam 11 is first brought into contact with the intermediate transfer member 1.

An area including the seam 90 of the intermediate transfer member 1 is a non-image-forming area and the area excluding it is an image forming area (hatched in FIG. 15). In the fifth embodiment, the edge of the cleaning blade 16 contacts the intermediate transfer member 1 first at an end position 91 in the non-image-forming area and last at an end position 92 that is located on the side opposite to the end position 91 in the non-image-forming area. Reference numeral 93 denotes a contact track. Since the position of the seam 90 is known, a controller (not shown) controls the contact/separation mechanism so that the track 93 avoids the seam 90. This prevents vibration or the like due to contact of the cleaning blade 16 with the seam 90. The cleaning blade 16 is separated from the intermediate transfer member 1 with timing that the intermediate transfer member 1 has made one rotation and its non-image-forming area has come close to the cleaning blade 16. As described later, the end of the edge of the cleaning blade 16 that contacted the intermediate transfer member 1 first is separated last. Separating the cleaning blade 16 with the timing that the intermediate transfer member 1 has made one rotation and its non-image-forming area has come close to the cleaning blade 16 (i.e., in a state that the cleaning blade 16 faces the non-image-forming area) makes it possible to cause the cleaning blade 16 not to contact the seam 90 at all from its contact to the intermediate transfer member 1 to its separation therefrom.

In this embodiment, as in the case of the cleaning blade 16, both ends of the secondary transfer roller 4 is provided with brackets 22 and 26. A cam 21 is engaged with the bracket 22 to constitute a contact/separation mechanism. As in the case of the cleaning blade 16, the end of the secondary transfer roller 4 that is located on the side opposite to the cam 21 is first brought into contact with the intermediate transfer member 1 to reduce the impact (described later in detail). That a controller (not shown) performs a control so that a contact track 93 of the secondary transfer roller 4 is placed in the non-image-forming area and avoids the seam 90 and that vibration or the like can thereby be prevented are entirely the same as in the case of the cleaning blade 16. The secondary transfer roller 4 is separated from the intermediate transfer member 1 with timing that the intermediate transfer member 1 has made one rotation and its non-image-forming area has come close to the secondary transfer roller 4. As described later, the end of the secondary transfer roller 4 that contacted the intermediate transfer member 1 first is separated last. Separating the secondary transfer roller 4 with the timing that the intermediate transfer member 1 has made one rotation and its non-image-forming area has come close to the secondary transfer roller 4 (i.e., in a state that the secondary transfer roller 4 faces the non-image-forming area) makes it possible to cause the secondary transfer roller 4 not to contact the seam 90 at all from its contact to the intermediate transfer member 1 to its separation therefrom.

Figure 16:
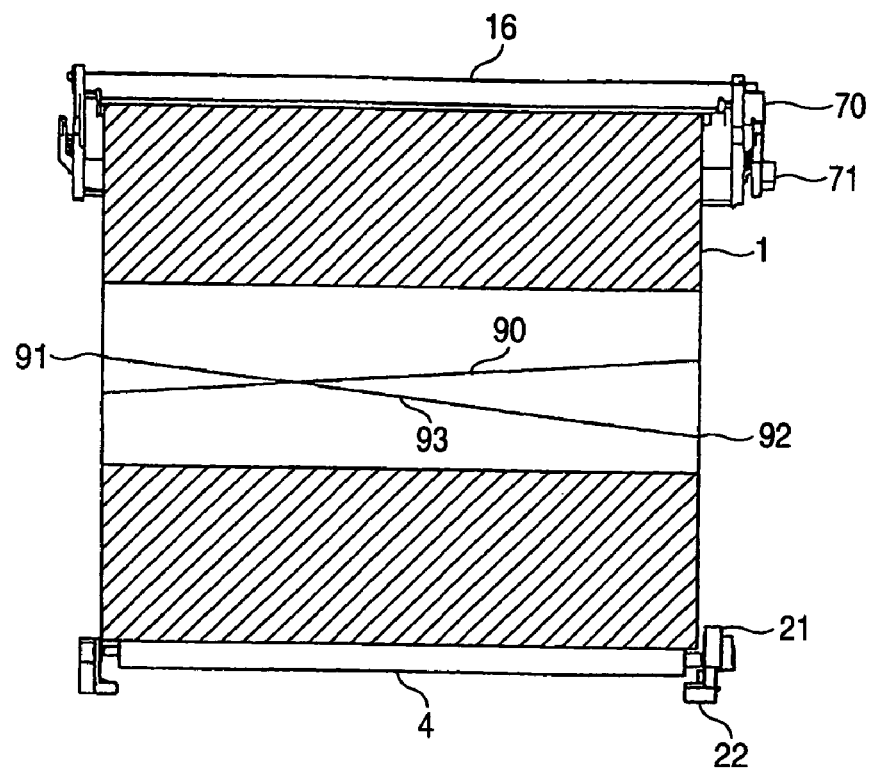
FIG. 16 illustrates manners of contact and separation of a cleaning blade according to a sixth embodiment of the invention.

FIG. 16 illustrates manners of contact and separation of the cleaning blade 16 in the image forming apparatus according to a sixth embodiment.

In FIG. 16, when the intermediate transfer member 1 has a seam 90 that is oblique with respect to the traveling direction (upward in the paper surface of FIG. 15). As described above, using the endless intermediate transfer member 1 having the oblique seam 90 makes it possible to reduce the impact that occurs when each roller or the cleaning blade 16 goes over the seam 90. Both ends of a support shaft of the cleaning blade 16 are provided with brackets 70 and 86. A cam 71 is engaged with the bracket 70 to constitute a contact/separation mechanism. The end of the edge of the cleaning blade 16 that is located on the side opposite to the cam 11 is first brought into contact with the intermediate transfer member 1.

An area including the seam 90 is a non-image-forming area and the area excluding it is an image forming area (hatched in FIG. 16). In this embodiment, the edge of the cleaning blade 16 contacts the intermediate transfer member 1 first at an end position 91 in the non-image-forming area and last at an end position 92 that is located on the side opposite to the end position 91 in the non-image-forming area. Reference numeral 93 denotes a contact track. A controller (not shown) controls the contact/separation mechanism 71 so that the track 93 crosses the seam 90. With this configuration, an abutment point between the cleaning blade 16 and the seam 90 are shifted subsequently, whereby the impact is reduced and vibration or the like can be prevented.

As in the case of the cleaning blade 16, a controller (not shown) controls the contact/separation mechanism 20 so that the secondary transfer roller 4 contacts the intermediate transfer member 1 first at the end position 91 in the non-image-forming area and last at the end position 92 that is located on the side opposite to the end position 91 in the non-image-forming area, and that a track 93 crosses the seam 90. With this configuration, an abutment point between the secondary transfer roller 4 and the seam 90 are shifted subsequently, whereby the impact is reduced and vibration or the like can be prevented.

In a case that both of the second transfer roller 4 and the cleaning blade 16 are brought into contact with the non-image-forming area of the intermediate transfer member 1 from the same side end of the second transfer roller 4 and the cleaning blade 16, it is possible that the second transfer roller 4 and the cleaning blade 16 contact the intermediate transfer member 1 so as to avoid the seam 90 as shown in FIG. 7 or contact the intermediate transfer member 1 so as to cross the seam 90. On the other hands, one of the second transfer roller 4 and the cleaning blade 16 is contacted with the intermediate transfer member 1 so as to avoid the seam 90 as shown in FIG. 7, and the other of them is contacted with the intermediate transfer member 1 so as to cross the seam 90 as shown in FIG. 8.

Figure 17:
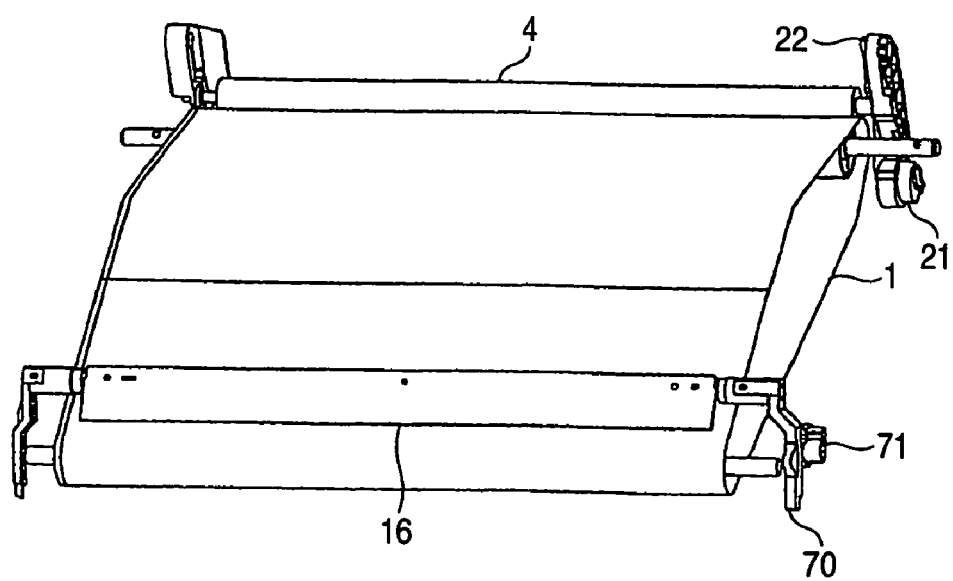
FIG. 17 is a perspective view showing a positional relationship between the intermediate transfer member, the cleaning blade, and a secondary transfer roller.

FIG. 17 is a perspective view showing a positional relationship between the intermediate transfer member 1, the cleaning blade 16, and the secondary transfer roller 4.

The bracket 70 of the cleaning blade 16 is engaged with the cam 71 and the bracket 70 of the secondary transfer roller 4 is engaged with the cam 21. The end of the cleaning blade 16 and the secondary transfer roller 4 that are located on the side opposite to the cam 71 and 21 contacts the intermediate transfer member 1 first, and the end on the side where the cam 71 and 21 are formed contacts the intermediate transfer member 1 last.

Figure 18:
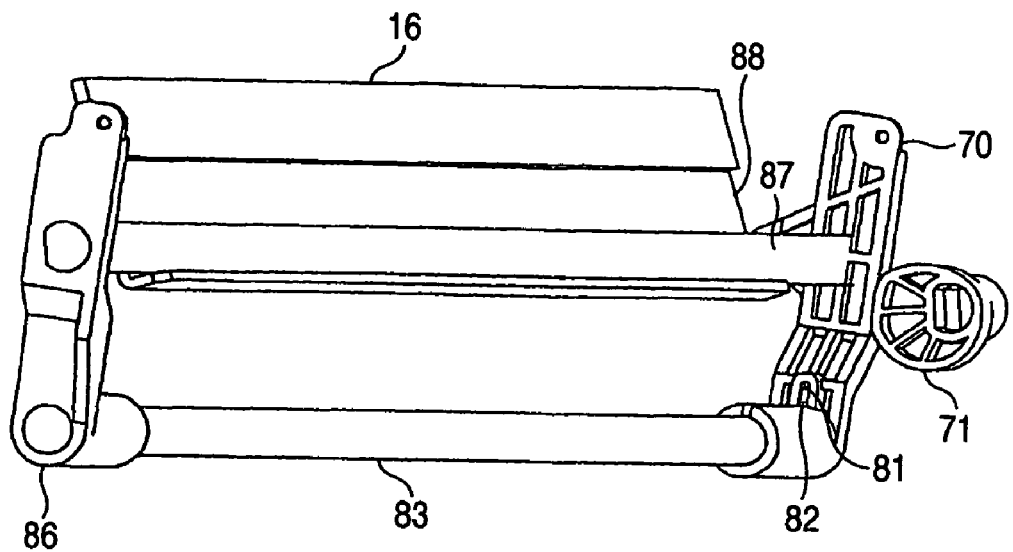
FIG. 18 is a perspective view illustrating manners of contact and separation of the cleaning blade.
Figure 19:
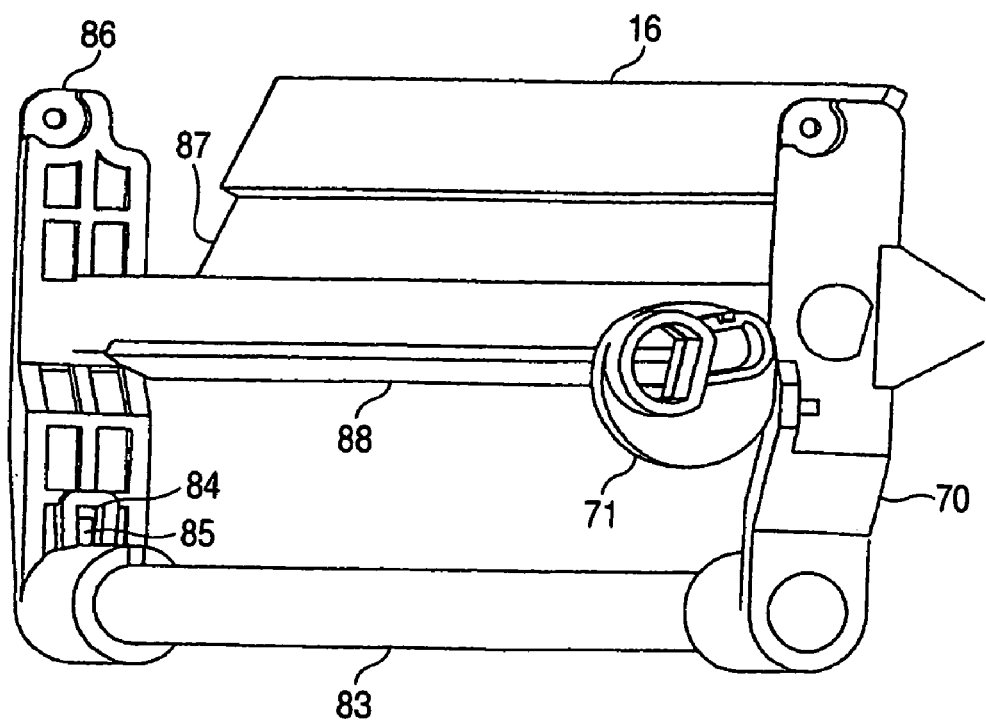
FIG. 19 is a perspective view illustrating the manners of contact and separation of the cleaning blade.

Next, the manners of contact and separation of the cleaning blade 16 will be described with reference to FIGS. 18 and 19. FIG. 18 is a perspective view in which a mechanism on the cam 71 side can be seen. FIG. 19 is a perspective view in which a mechanism on the side opposite to the cam 71 can be seen. Deformation is done in each of FIGS. 18 and 19 for convenience of description.

As shown in FIG. 18, the bracket 70 is fitted with a support point shaft 83 and a pin 82 that is planted in the support point shaft 83 is fitted in a hole 81 of the bracket 70 without play. A support plate 87 that is provided between the brackets 70 and 86 supports the cleaning blade 16 that is attached to a metal sheet 88. As shown in FIG. 19, the bracket 86 is fitted with the other end portion of the support point shaft 83 and a pin 85 projecting from the support point shaft 83 is loosely fitted in a hole 84 of the bracket 86. Each of the brackets 70 and 86 is always urged toward the intermediate transfer member 1 by an elastic member (not shown).

With the above structure, the bracket 70 is turned about the support point shaft 83 as the cam 71 is rotated. Since the pin 82 is fitted in the hole 81 without play, the support point shaft 83 is rotated together with the bracket 70. The pin 85 on the other side is turned together with the support point shaft 83. Since play exists between the pin 85 and the hole 84, the bracket 86 is turned with a delay that corresponds to the play. Since each of the brackets 70 and 86 is urged toward the intermediate transfer member 1 by the elastic member (not shown), the support plate 87 is pushed by the bracket 86 which is located on the side opposite to the cam 71 by an amount corresponding to the play between the pin 85 and the hole 84, whereby the bracket-86-side end of the edge of the cleaning blade 16 contacts the intermediate transfer member 1 first and the support plate 87 is twisted by an amount corresponding to the play. Finally, the cam-71-side end of the edge of the cleaning blade 16 contacts the intermediate transfer member 1. At the time of separation, as the cam mechanism operates, the bracket 70 is turned first and the bracket 86 is turned with a delay corresponding to the play. The cleaning blade 16 follows that operation. In this configuration, the contact/separation mechanism is constituted by a single cam, thereby the cost down is achieved.

FIGS. 20A and 20B illustrate manners of contact timings of the secondary transfer roller and the cleaning blade in the image forming apparatus.

In FIGS. 20A and 20B, the intermediate transfer member 1 travels left side to right side in the drawing. The intermediate transfer member 1 has a belt form, and is formed like an endless belt by joining the ends thereof. An area including the seam of the intermediate transfer member 1 is a non-image-forming area and the area excluding it is an image forming area. FIG. 20A shows the abutment timing of the secondary transfer roller. When the non-image-forming area comes close to a position of the secondary transfer belt, ON signal is applied to the secondary transfer roller (T2) so that the end of the edge of the secondary transfer roller comes into contact with the intermediate transfer member 1 first and the contact of the secondary transfer roller is completion in the non-image-forming area. In this example, a contact track of the secondary transfer roller crosses a seam that is oblique with respect to the traveling direction of the intermediate transfer member. A transfer is performed at a four color image area (FIG. 20A) in a left side of the non-image-forming area by the contact of the secondary transfer roller. The transfer is proceeded, and ON signal is applied to the cleaning blade at a timing that the non-image-forming area comes to a position of the cleaning blade so that the cleaning blade comes into contact with the intermediate transfer member 1 in the non-image-forming area. In this way, since contact start timings of the secondary transfer roller and the cleaning blade are shifted, the impact is reduced so that the image failure caused by bounding can be prevented. Also, by shifting separation start timings of the secondary transfer roller and the cleaning blade with respect to the intermediate transfer belt, the impact caused by the separation of the secondary transfer roller and the cleaning blade is reduced so that the image failure caused by bounding can be prevented.

Figure 21A:
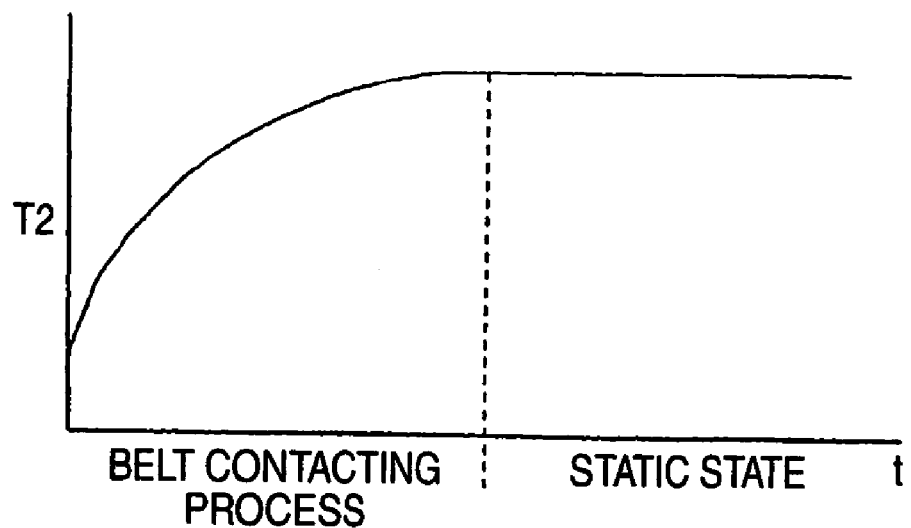
FIGS. 21A and 21B are perspective views of the secondary transfer roller contact/separation mechanism as viewed approximately from the two respective ends.
Figure 21B:
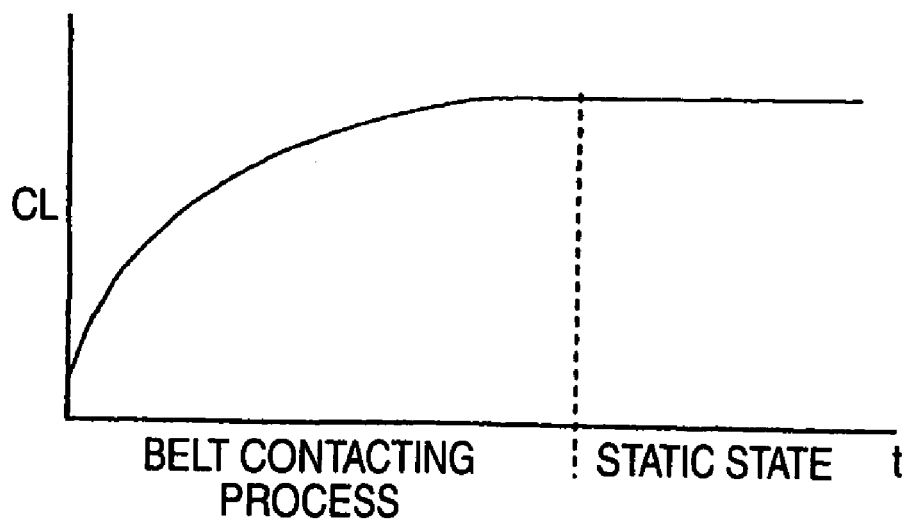

FIGS. 21A and 21B illustrate manners of the time required for the secondary transfer roller and the cleaning blade to come into contact with the intermediate transfer belt. FIG. 21A shows the time required for contact of the secondary transfer roller. FIG. 21B shows the time required for contact of the cleaning blade.

Since the secondary transfer roller needs to be stability in a circumferential speed before the secondary transfer roller reaches to the image-forming area after contacting the intermediate transfer belt at the non-image-forming area, the time that takes from the start of the contact to the steady state is short. On the other hand, the cleaning blade has a plenty of time required to contact since the cleaning blade simply contacts the intermediate transfer belt. Therefore, the cleaning blade can have longer time required for the contact than the time of the secondary transfer roller required for the contact.

The image forming apparatus according to a seventh embodiment of the invention includes a preliminary rotation mechanism (i.e., preliminary rotation transmission roller) 15 for giving preliminary rotation of a prescribed rotation speed to a secondary transfer roller 113. In a state that the secondary transfer roller 113 is separated from the intermediate transfer belt 1, the secondary transfer roller 113 is engaged with the preliminary rotation transmission roller 115 by a contact/separation mechanism 114 for bringing the secondary transfer roller 113 into contact with or separating it from the intermediate transfer belt 1, whereby the secondary transfer roller 113 is caused to rotate at the prescribed rotation speed. Then, the secondary transfer roller 113 is separated from the preliminary rotation transmission roller 115 and brought into contact with the intermediate transfer belt 1.

Figure 22A:
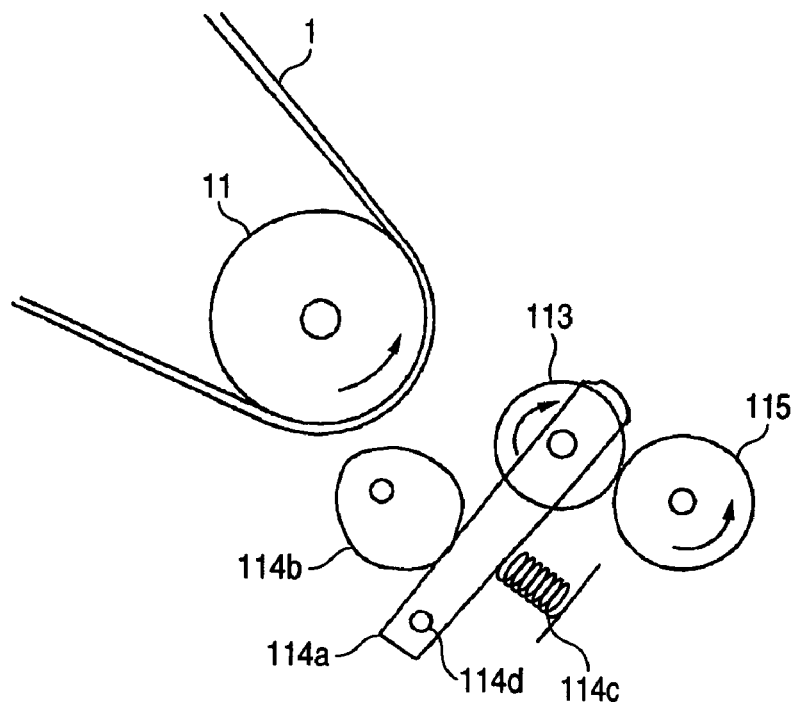
FIGS. 22A and 22B illustrate a preliminary rotation mechanism according to the seventh embodiment of the present invention.
Figure 22B:
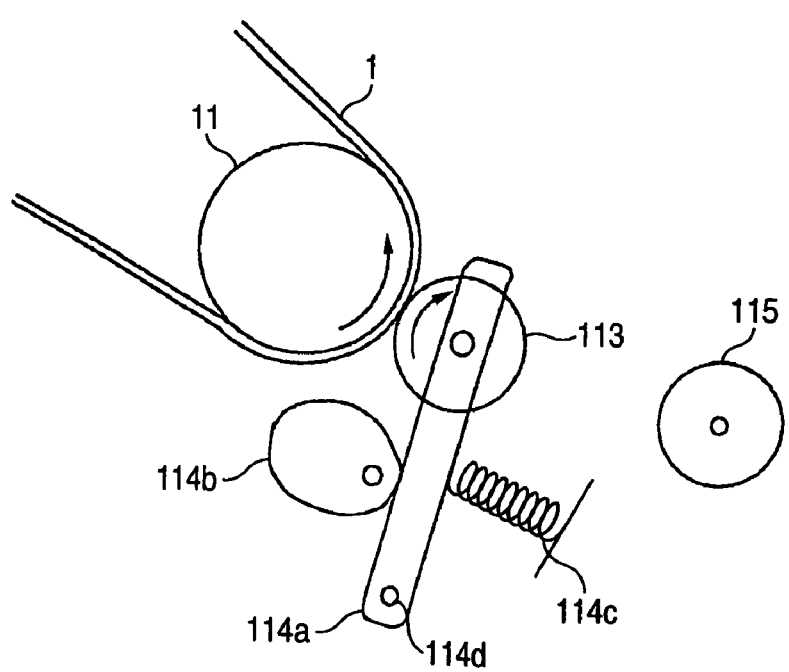

FIGS. 22A and 22B illustrate the preliminary rotation mechanism for rotating the secondary transfer roller 113 preliminarily according to the seventh embodiment of the present invention. FIG. 24A shows a state that the secondary transfer roller 113 is separated from the intermediate transfer belt 1, and FIG. 24B shows a state that the secondary transfer roller 113 is in contact with the intermediate transfer belt 1.

The secondary transfer roller 113 is separated from the intermediate transfer belt 1 and engaged with the preliminary rotation transmission roller 115 or is separated from the preliminary rotation transmission roller 115 and engaged with the intermediate transfer belt 1 as a rod 114a that is part of the contact/separation mechanism 114 is turned. The rod 114a, which can be turned about a shaft 114d, is engaged with a cam 114b and urged toward the intermediate transfer belt 1 by a pressure spring 114c.

As shown in FIG. 22A, as the cam 114b is rotated, the rod 114a is turned toward the preliminary rotation transmission roller 115 against the pressure spring 114c and the secondary transfer roller 113 is engaged with the preliminary rotation transmission roller 115, whereby the secondary transfer roller 113 is given preliminary rotation. At the time of a secondary transfer, the cam 114b is rotated so that the pressure spring 114c pushes the rod 114a toward the intermediate transfer belt 1, whereby the secondary transfer roller 113 contacts the intermediate transfer belt 1 to perform a secondary transfer. At this time, since the secondary transfer roller 113 has been given the preliminary rotation whose circumferential speed is approximately equal to the circumferential speed of the intermediate transfer belt 1, no force is generated that causes a speed variation in the movement of the intermediate transfer belt 1. Since only the secondary transfer roller 113 contacts the intermediate transfer belt 1 after being separated from the preliminary rotation transmission roller 115, the impact is weaker then in the conventional case and does not cause a phenomenon that resulting vibration influences the primary transfer section.

It is probable that the rotation speed of the secondary transfer roller 113 somewhat decreases in a period from its separation from the preliminary rotation transmission roller 115 to its contact with the intermediate transfer belt 1. Therefore, it is desirable that the circumferential speed of the preliminary rotation that is given to the secondary transfer roller 113 by the preliminary rotation transmission roller 115 is set somewhat higher than that of the intermediate transfer belt 1.

The rotation speed of the secondary transfer roller 113 has decreased when the secondary transfer roller 113 again contacts the preliminary rotation transmission roller 115 after being separated from the intermediate transfer belt 1 because of completion of a secondary transfer. Therefore, it is desirable that the rotation speed of the preliminary rotation transmission roller 115 is controlled so as to be approximately equal to a decreased rotation speed of the secondary transfer roller 113. That is, it is desirable that the driving system of the preliminary rotation transmission roller 115 control the preliminary rotation transmission roller 115 so as to give different rotation speeds to the preliminary rotation transmission roller 115 when the secondary transfer roller 113 is separated from the preliminary rotation transmission roller 115 and when the secondary transfer roller 113 is in contact with the preliminary rotation transmission roller 115.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An image forming apparatus, comprising:
   a belt member;
   a transfer member, abutted against the belt member to transfer a toner image to a recording medium;
   a contact/separation mechanism, bringing the transfer member into contact with a first widthwise end portion in the belt member first; and
   a cleaning member which is abutted against the belt member;
   wherein the cleaning member is brought into contact with the first widthwise end portion of the belt member first.

2. An image forming apparatus, comprising:
   a belt member;
   a transfer member, abutted against the belt member to transfer a toner image to a recording medium; and
   a contact/separation mechanism, bringing the transfer member into contact with a first widthwise end portion in the belt member first;
   wherein the belt member has a multilayer structure with an electrode layer provided on the first widthwise end portion; and
   wherein the transfer member is brought into contact with the electrode layer of the belt member first.

3. The image forming apparatus as set forth in claim 2, wherein the contact/separation mechanism separates the transfer member from the first widthwise end portion in the belt member so that the transfer member is entirely separated from the belt member.

4. The image forming apparatus as set forth in claim 1, wherein the transfer member and the cleaning member are respectively brought into contact with the belt member at a different timing.

5. The image forming apparatus as set forth in claim 1, wherein the transfer member and the cleaning member are respectively separated from the belt member at a different timing.

6. The image forming apparatus as set forth in claim 1, wherein the belt member has a multilayer structure with an electrode layer provided on the first widthwise end portion; and
   wherein the transfer member and the cleaning member are brought into contact with the electrode layer of the belt member first.

7. The image forming apparatus as set forth in claim 1, wherein the contact/separation mechanism separates the cleaning member from the first widthwise end portion in the belt member so that the cleaning member is entirely separated from the belt member.

8. An image forming apparatus, comprising:
   a belt member;
   a transfer member, abutted against the belt member to transfer a toner image to a recording medium; and
   a contact/separation mechanism, bringing the transfer member into contact with a first widthwise end portion in the belt member first;
   wherein the belt member is seamed to form an endless belt, and the belt member including a first region corresponding to an image forming region and a second region corresponding to a non-image forming area, the second region having a seam of the belt member;

wherein the contact/separation mechanism brings the transfer member into contact with a first widthwise end portion in the second region of the belt member first; and wherein the transfer member is entirely brought into contact with the belt member in the second region thereof so that a track of a contact point between the transfer member and the belt member extends so as to cross the seam of the belt member.

9. The image forming apparatus as set forth in claim 8, further comprising a cleaning member which is abutted against the belt member, wherein the cleaning member is brought into contact with the first widthwise end portion in the second region of the belt member first; and wherein the cleaning member is entirely brought into contact with the belt member in the second region thereof so that a track of a contact point between the cleaning member and the belt member extends so as to cross the seam of the belt member.

10. The image forming apparatus as set forth in claim 9, wherein the transfer member and the cleaning member are respectively brought into contact with the belt member at a different timing.

11. The image forming apparatus as set forth in claim 9, wherein the transfer member and the cleaning member are respectively separated from the belt member at a different timing.

12. The image forming apparatus as set forth in claim 9, wherein the contact/separation mechanism separates the cleaning member from the first widthwise end portion in the belt member so that the cleaning member is entirely separated from the belt member.

13. The image forming apparatus as set forth in claim 8, further comprising a cleaning member which is abutted against the belt member, wherein the cleaning member is brought into contact with the first widthwise end portion in the second region of the belt member first; and wherein the cleaning member is entirely brought into contact with the belt member in the second region thereof so that a track of a contact point between the cleaning member and the belt member extends so as to avoid the seam of the belt member.

14. The image forming apparatus as set forth in claim 13, wherein the transfer member and the cleaning member are respectively brought into contact with the belt member at a different timing.

15. The image forming apparatus as set forth in claim 13, wherein the transfer member and the cleaning member are respectively separated from the belt member at a different timing.

16. The image forming apparatus as set forth in claim 13, wherein the contact/separation mechanism separates the cleaning member from the first widthwise end portion in the belt member so that the cleaning member is entirely separated from the belt member.

17. The image forming apparatus as set forth in claim 13, wherein the belt member has a multilayer structure with an electrode layer provided on the first widthwise end portion; and wherein the transfer member and the cleaning member are respectively brought into contact with the electrode layer of the belt member first.

18. The image forming apparatus as set forth in claim 8, wherein the contact/separation mechanism separates the transfer member from the first widthwise end portion in the belt member so that the second transfer member is entirely separated from the belt member.

19. An image forming apparatus, comprising:

a belt member;

a transfer member, abutted against the belt member to transfer a toner image to a recording medium; and a contact/separation mechanism, bringing the transfer member into contact with a first widthwise end portion in the belt member first, wherein the belt member is seamed to form an endless belt, and the belt member including a first region corresponding to an image forming region and a second region corresponding to a non-image forming area, the second region having a seam of the belt member;

wherein the contact/separation mechanism brings the transfer member into contact with the first widthwise end portion in the second region of the belt member first;

wherein the transfer member is entirely brought into contact with the belt member in the second region thereof so that a track of a contact point between the transfer member and the belt member extends so as to avoid the seam of the belt member.

20. The image forming apparatus as set forth in claim 19, further comprising a cleaning member which is abutted against the belt member, wherein the cleaning member is brought into contact with the first widthwise end portion in the second region of the belt member first; and wherein the cleaning member is entirely brought into contact with the belt member in the second region thereof so that a track of a contact point between the cleaning member and the belt member extends so as to cross the seam of the belt member.

21. The image forming apparatus as set forth in claim 20, wherein the transfer member and the cleaning member are respectively brought into contact with the belt member at a different timing.

22. The image forming apparatus as set forth in claim 20, wherein the transfer member and the cleaning member are respectively separated from the belt member at a different timing.

23. The image forming apparatus as set forth in claim 20, wherein the contact/separation mechanism separates the cleaning member from the first widthwise end portion in the belt member so that the cleaning member is entirely separated from the belt member.

24. The image forming apparatus as set forth in claim 19, further comprising a cleaning member which is abutted against the belt member, wherein the cleaning member is brought into contact with the first widthwise end portion in the second region of the belt member first; and wherein the cleaning member is entirely brought into contact with the belt member in the second region thereof so that a track of a contact point between the cleaning member and the belt member extends so as to avoid the seam of the belt member.

25. The image forming apparatus as set forth in claim 24, wherein the transfer member and the cleaning member are respectively brought into contact with the belt member at a different timing.

26. The image forming apparatus as set forth in claim 24, wherein the transfer member and the cleaning member are respectively separated from the belt member at a different timing.

27. The image forming apparatus as set forth in claim 24, wherein the contact/separation mechanism separates the cleaning member from the first widthwise end portion in the belt member so that the cleaning member is entirely separated from the belt member.

28. The image forming apparatus as set forth in claim 19, wherein the belt member has a multilayer structure with an electrode layer provided on the first widthwise end portion; and wherein the transfer member and the cleaning member are respectively brought into contact with the electrode layer of the belt member first.

29. The image forming apparatus as set forth in claim 19, wherein the contact/separation mechanism separates the transfer member from the first widthwise end portion in the belt member so that the transfer member is entirely separated from the belt member.

30. An image forming apparatus, comprising:
a belt member;
a transfer member, abutted against the belt member to transfer a toner image to a recording medium; and
a contact/separation mechanism, keeping the transfer member in contact with a first widthwise end portion in the belt member;
wherein a first end portion of the secondary transfer member which is kept in contact with the first widthwise end portion in the belt member is formed by an insulative elastic member;
wherein the transfer member is a transfer roller;
wherein the insulative elastic member is larger in diameter than the transfer roller; and
wherein the insulative elastic member is comprised of a material that is softer than the transfer roller.

31. The image forming apparatus as set forth in claim 30, wherein the belt member has a multilayer structure with an electrode layer provided on the first widthwise end portion; and wherein the transfer member is kept in contact with the electrode layer of the belt member.

32. An image forming apparatus, comprising:
a belt member;
a cleaning member, abutted against the belt member; and
a contact/separation mechanism, bringing the cleaning member into contact with a first widthwise end portion in the belt member first;
wherein the belt member has a multilayer structure with an electrode layer provided on the first widthwise end portion; and
wherein the cleaning member is brought into contact with the electrode layer of the belt member first.

33. The image forming apparatus as set forth in claim 32, wherein the belt member is seamed to form an endless belt.

34. The image forming apparatus as set forth in claim 32, wherein the contact/separation mechanism separates the cleaning member from the first widthwise end portion in the belt member so that the cleaning member is entirely separated from the belt member.

35. An image forming apparatus, comprising:
a belt member;
a cleaning member, abutted against the belt member; and
a contact/separation mechanism, bringing the cleaning member into contact with a first widthwise end portion in the belt member first;
wherein the contact/separation mechanism separates the cleaning member from the first widthwise end portion in the belt member so that the cleaning member is entirely separated from the belt member;
wherein the belt member is seamed to form an endless belt, and the belt member including a first region corresponding to an image forming region and a second region corresponding to a non-image forming area, the second region having a seam of the belt member;
wherein the contact/separation mechanism brings the cleaning member into contact with the first widthwise end portion in the second region of the belt member first; and
wherein the contact/separation mechanism separates the cleaning member from the first widthwise end portion in the second region of the belt member so that the cleaning member is entirely separated from the belt member.

* * * * *